(12) United States Patent
Shao et al.

(10) Patent No.: US 11,011,183 B2
(45) Date of Patent: May 18, 2021

(54) EXTRACTING KNOWLEDGE FROM COLLABORATIVE SUPPORT SESSIONS

(71) Applicant: Cisco Technology, Inc., San Jose, CA (US)

(72) Inventors: Qihong Shao, Clyde Hill, WA (US); Pranjal Daga, San Jose, CA (US); Dmitry Goloubew, Waterloo (BE); Anastasia Feygina, Mountain View, CA (US); Antonio Nucci, San Jose, CA (US); Carlos M. Pignataro, Cary, NC (US); Gyana R. Dash, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 53 days.

(21) Appl. No.: 16/363,215

(22) Filed: Mar. 25, 2019

(65) Prior Publication Data

US 2020/0312348 A1 Oct. 1, 2020

(51) Int. Cl.
  *G10L 21/10* (2013.01)
  *H04L 29/06* (2006.01)
  (Continued)

(52) U.S. Cl.
  CPC .......... *G10L 21/10* (2013.01); *G06F 3/04845* (2013.01); *G06F 40/30* (2020.01);
  (Continued)

(58) Field of Classification Search
  CPC ...................................................... G10L 21/10
  See application file for complete search history.

(56) References Cited

U.S. PATENT DOCUMENTS

| 8,423,012 B1 * | 4/2013 | Abou-El-Ella | H04W 8/24 455/423 |
| 2006/0214937 A1 * | 9/2006 | Saund | G06K 9/00463 345/582 |

(Continued)

OTHER PUBLICATIONS

David D. Palmaer, The MITRE Corporation, "Chapter 2: Tokenisation and Sentence Segmentation", Handbook of Natural Language Processing, https://tm-town-nlp-resources.s3.amazonaws.com/ch2.pdf, 2007, 23 pages.

(Continued)

*Primary Examiner* — Shaun Roberts
(74) *Attorney, Agent, or Firm* — Edell, Shapiro and Finnan, LLC

(57) ABSTRACT

At a communication server, a first computer device and a second computer device are connected to a collaborative support session configured to support audio communications, screen sharing, and control of the first computer device by the second computer device. Screen sharing video image content is converted to a text sequence with timestamps. A text log with timestamps is generated from the text sequence. Using a command-based machine learning model, a sequence of commands and associated parameters, with timestamps, are determined from the text log. Audio is analyzed to produce speech-based information with timestamps. The command sequence is time-synchronized with the speech-based information based on the timestamps of the command sequence and the timestamps of the speech-based information. A knowledge report for the collaborative support session is generated. The knowledge report includes entries each including a timestamp, commands and associated parameters, and speech-based information that are time-synchronized to the timestamp.

20 Claims, 23 Drawing Sheets

(51) Int. Cl.
G06F 3/0484 (2013.01)
H04L 29/08 (2006.01)
G10L 15/16 (2006.01)
G10L 15/18 (2013.01)
G10L 15/22 (2006.01)
G06N 20/00 (2019.01)
G06F 40/30 (2020.01)

(52) U.S. Cl.
CPC .............. G06N 20/00 (2019.01); G10L 15/16 (2013.01); G10L 15/1815 (2013.01); G10L 15/22 (2013.01); H04L 65/1089 (2013.01); H04L 65/601 (2013.01); H04L 67/22 (2013.01); G06K 2209/01 (2013.01); G10L 2015/223 (2013.01)

(56) References Cited

U.S. PATENT DOCUMENTS

| | | | | |
|---|---|---|---|---|
| 2015/0149540 | A1* | 5/2015 | Barker | H04L 12/1827 709/204 |
| 2016/0277779 | A1* | 9/2016 | Zhang | H04N 21/234381 |
| 2017/0091320 | A1* | 3/2017 | Psota | G06F 16/334 |
| 2018/0253676 | A1* | 9/2018 | Sheth | G06Q 10/06316 |
| 2018/0285744 | A1* | 10/2018 | Kang | G06F 16/41 |
| 2019/0042387 | A1* | 2/2019 | Aloni | G06F 9/452 |
| 2019/0122160 | A1* | 4/2019 | Kolandaiswamy | G06F 11/3476 |
| 2019/0236547 | A1* | 8/2019 | Huang | H04L 65/4015 |
| 2019/0266253 | A1* | 8/2019 | Maiti | G06F 11/0712 |
| 2020/0005046 | A1* | 1/2020 | Attorre | G06K 9/00718 |

OTHER PUBLICATIONS

"Open CV", https://opencv.org/, retrieved from the Internet on Mar. 25, 2019, 2 pages.
"OpenNMT", https://opennmt.net/, Open-Source Neural Machine Translation, retrieved from the internet on Mar. 25, 2019, 2 pages.
David M. Blei, et al., "Latent Dirichlet Allocation", Journal of Machine Learning Research 3 (2003) 993-1022, Jan. 2003, 30 pages.
"Confidential Transcriptions Pricing / Rates / Cost", https:www.confidentialtranscription.co.nz/pricing.htm, retrieved from the Internet on Mar. 25, 2019, 2 pages.
Xuedong Huang, "Microsoft researchers achieve new conversational speech recognition milestone", https://www.microsoft.com/en-us/research/blog/microsoft-researchers-achieve-new-conversational-speech-recognition-milestone/, Aug. 20, 2017, Microsoft Research Blog, 6 pages.

* cited by examiner

FIG.10A t1 EVENT 1 sh vdc

WE ARE ON A BOX CALLED NEXUS, SO THIS BOX HAS ACTUALLY FEW LOGICAL PARTITIONS CALLED VDCS license. Certain components of this software are licensed under the GNU General Public License (GPL) version 2.0 or the GNU Lesser General Public License (LGPL) Version 2.1. A copy of each

NEXUS #
NEXUS #

| vdc_id | vdc_name | state | mac | type | lc |
|---|---|---|---|---|---|
| 1 | NEXUS | active | 00:1b:54:c2:42:41 | Admin | None |
| 2 | SPINE | active | 00:1b:54:c2:42:42 | Ethernet | f2e f3 |
| 3 | SPINE2 | active | 00:1b:54:c2:42:43 | Ethernet | f2e f3 |
| 4 | LEAF | active | 00:1b:54:c2:42:44 | Ethernet | m1 f1 m1xl |
| 5 | OTV | active | 00:1b:54:c2:42:45 | Ethernet | m1 f1 m1xl |
| 6 | L3_1 | active | 00:1b:54:c2:42:46 | Ethernet | m1 m1xl m2xl f2e |
| 7 | L3_2 | active | 00:1b:54:c2:42:47 | Ethernet | m1 m1xl m2xl f2e |
| 8 | OTV2 | active | 00:1b:54:c2:42:48 | Ethernet | m1 m1xl m2xl f2e |
| 9 | new | active | 00:1b:54:c2:42:49 | Ethernet | m1 m1xl m2xl f2e |

1000

```
starpoc-gpu-01# sudo netstat -plunt | grep apache2
starpoc-gpu-01#
...
starpoc-gpu-01#
...
starpoc-gpu-01# sudo netstat -plunt | grep apache2
...
starpoc-gpu-01#
...
``` tn EVENT n

LOOKS LIKE WE'VE TO TRY SEPARATE SERVICES AND CHECK IF THEY ARE RUNNING. UMM, APACHE IS NOT RUNNING. SEEMS LIKE WE FOUND THE PROBLEM. LET'S TROUBLESHOOT IT!

FIG.11E

| TIME START | TIME END | OUTPUT | HOST | HOST SERIAL | PLATFORM | RAW COMMAND | NORMALIZED COMMAND | COMMAND CONTEXT | TIME IN FOCUS | ATTENTION CONTEXT | INTERACTIONS | INTERACTION CONTEXT | SPEECH EMOTION | AGGREGATE ATTENTION |
|---|---|---|---|---|---|---|---|---|---|---|---|---|---|---|
| 0:00:11 | 0:00:12 | OUTPUT 1 | n9k-core1 | sn0000001 | NEXUS 9000 | sh int e1/3 | SHOW INTERFACES | e1/3 | 0:00:07 | THIS IS ODD | SELECT, COPY | Po1 | NEUTRAL | 0.3 |
| 0:00:19 | 0:00:19 | OUTPUT 2 | n9k-core1 | sn0000001 | NEXUS 9000 | sh lac cou int po1 | SHOW LACP COUNTERS | po1 | 0:00:01 | - | PASTE | Po1 | NEUTRAL | 0.1 |
| 0:00:21 | 0:00:22 | OUTPUT 3 | n9k-core1 | sn0000001 | NEXUS 9000 | sh cdp ne e1/3 | SHOW CDP NEIGHBORS | e1/3 | 0:00:01 | - | COPY | n9k-core2.example.net | NEUTRAL | 0.1 |

EXTRACTING KNOWLEDGE FROM COLLABORATIVE SUPPORT SESSIONS

TECHNICAL FIELD

The present disclosure relates to extracting useful information from collaborative support sessions.

BACKGROUND

Network-based collaboration tools are commonly used to conduct remote troubleshooting and support during web-based collaboration support sessions (also referred to as "troubleshooting sessions"). Such tools allow customers and support specialists to communicate via audio and video, permit screen sharing, and/or allow control over a remote computer device. Such troubleshooting sessions contain valuable knowledge, such as discussions of symptoms and intents, problem clarifications, hypothesis definition and testing, and solution testing. Unfortunately, gathering concise information from the troubleshooting sessions and digitizing specifically useful information from the sessions for future use presents many challenges. Such challenges make standard and generic tools incompetent for extracting the ingrained knowledge from the troubleshooting sessions in an efficient manner.

BRIEF DESCRIPTION OF THE DRAWINGS

FIGS. 10A-10D collectively illustrate extracted knowledge for a collaborative support session used to troubleshoot a network application, according to an example embodiment.

FIGS. 11A-11E collectively illustrate extracted knowledge for a collaborative support session used to troubleshoot a Linux server, according to an example embodiment.

FIG. 14 is an illustration of an extracted knowledge report for a collaborative support session generated by a report generating operation of the method of FIG. 13, according to an example embodiment

DESCRIPTION OF EXAMPLE EMBODIMENTS

Overview

Figure 1:
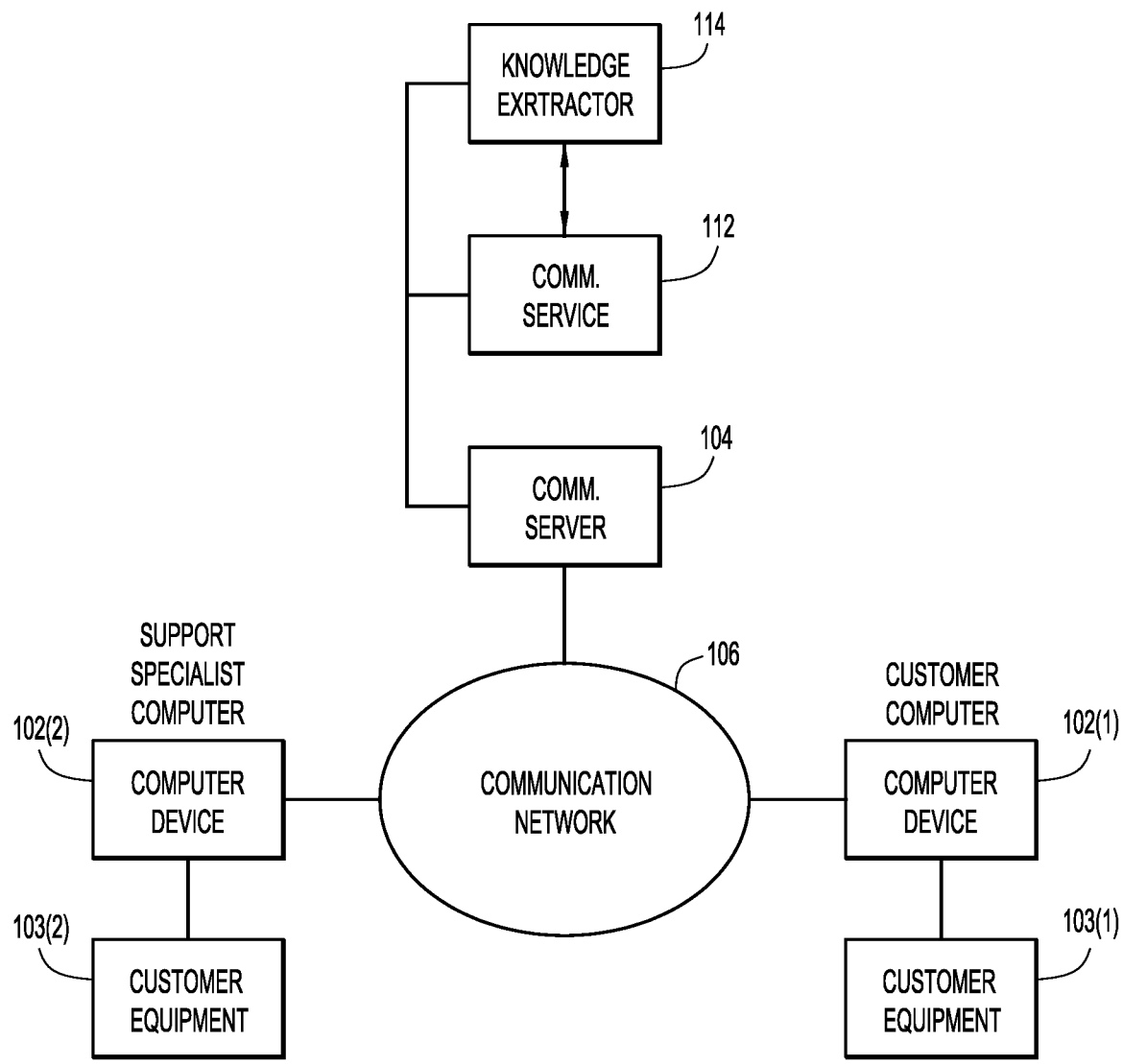
FIG. 1 is a diagram of a network environment in which embodiments used to extract knowledge from collaborative support sessions may be implemented, according to an example embodiment.

At a communication server, a first computer device and a second computer device are connected to a collaborative support session configured to support audio communications, screen sharing, and control of the first computer device by the second computer device. Screen sharing video image content is converted to a text sequence with time-stamps. A text log with timestamps is generated from the text sequence. Using a command-based machine learning model, a command sequence including commands and associated parameters, with command sequence timestamps, that were entered at either the first computer device or the second computer device, are determined from the text log. Audio associated with the collaborative support session is analyzed to produce speech-based information with speech-based information timestamps. The command sequence is time-synchronized with the speech-based information based on the command sequence timestamps and the speech-based information timestamps. A knowledge report for the collaborative support session is generated. The knowledge report includes entries each respectively including a timestamp, one or more of the commands and the associated parameters, and the speech-based information that are time-synchronized to the timestamp.

Example Embodiments

Collaboration tools such as WebEx, Skype, Google Hangouts, Zoom, and the like, are commonly used to conduct remote troubleshooting and support during collaborative support sessions (also referred to as "troubleshooting sessions"). Such tools allow customers and support specialists to communicate via audio and video, permit screen sharing, and/or allow control over a remote computer device (i.e., "remote control"). Screen sharing and remote control are often used to collaboratively troubleshoot complex issues. The customers typically have access to networks or customer equipment through a customer computer device, and the support specialist may use a support specialist computer device to accesses the network/customer equipment through the customer computer device. Such troubleshooting sessions contain valuable knowledge, such as discussions of symptoms and intents, problem clarifications, hypothesis definition and testing, solution testing. Such troubleshooting-centric knowledge is not present anywhere else except from within the context of the troubleshooting sessions, but offers high value for training technical personnel, training support automation and augmentation systems, and improving products.

Unfortunately, unwinding the intellectual capital from the troubleshooting sessions and digitizing specifically useful information from the sessions for future use is difficult for the following reasons. Hundreds of thousands of sessions are recorded every year, with many recordings lasting more than 2 hours each on average. It is overly time consuming to manually listen to each recording in isolation and manually extract actionable knowledge from the session. Furthermore, most of the sessions have many long, low-activity periods, which render actual listening to their recordings tedious. Also, because of the highly complex and specific nature of the problems discussed during the sessions, the sessions include many "trail-and-error" activities executed as part of the troubleshooting process. Thus, there is a fine line between context gathering attempts and real attempts to remediate actual problems. Additionally, the troubleshooting process is complex and typically does not follow any defined protocol or procedure (i.e., sequence of steps) but is instead mostly based on the intuition and expertise of the technical support personnel involved. Another problems is that highly trained technical support specialists are a scarce resource for any organization, hence allocating sufficient resources to analyze all of the sessions after-the-fact is practically unrealistic. Moreover, troubleshooting sessions usually take place in open spaces with high background noise, and with multiple speakers of different nationalities. Also, as mentioned before, the sessions tend to be highly technical in nature, and often refer to specific details of product, feature, software or hardware configurations. All of these challenges make standard and generic tools incompetent in extracting the ingrained knowledge from customer interaction sessions in an efficient manner.

In many video conferences, customers and support specialists share screens, sometimes run different commands on their terminals, other times show slide-decks in video presentations, and so on. Long video presentations (e.g., one hour or longer) make it difficult and time consuming for participants to manually note all of the useful information (e.g. commands used for troubleshooting or presentation slides) by watching recordings of the sessions. Furthermore, there may be a need for a level of knowledge/intelligence to discern or extract essential/important information from the recording, but that knowledge/intelligence may not be available. For example, not all commands used in troubleshooting are effective because some of them may be duplicate or dummy commands.

Accordingly, embodiments presented herein provide an effective knowledge extractor to extract essential/important knowledge/contents from a collaborative support session in an automated fashion, without manual intervention. The knowledge extractor extracts the knowledge from information shared on screen, and from video and audio communications exchanged between participants, e.g., a support specialist and a customer, during the collaborative support session.

Referring first to FIG. 1, there is shown a diagram an example network environment 100 in which embodiments used to extract knowledge from collaborative support sessions may be implemented. Environment 100 includes computer devices 102(1) and 102(2) (collectively referred to as computer devices 102) operated by a customer and a support specialist, respectively, customer equipment 103(1) and 103(2) connected to, and accessible/controlled through, computer devices 102(1) and 102(2), respectively, a communication (comm.) server 104 to host a network-based communication service, and a communication network 106 over which the computer devices and the communication server communicate. In the ensuing description, computer devices 102(1) and 102(2) may also be referred to as customer computer device 102(1) and support specialist computer device 102(2). Computer devices 102 may each take on a variety of forms, including a landline telephone, SmartPhone, tablet, laptop computer, desktop computer, video conference endpoint, and the like. Customer equipment 103(1) and 103(2) may include, but are not limited to, network devices, such as routers and switches, connected to a customer network, for example. Communication network 106 may be any one or more of a wired or wireless local area networks (LANs) and wired or wireless wide area network (WANs), including the Internet. While FIG. 1 shows a single communication server and two computer devices, it is to be understood that there may be many more communication servers and computer devices in a given network environment.

Communication server 104 hosts a communication service 112 (e.g., a WebEx application) that provides access to, and supports/manages, web-based collaborative support sessions to which computer devices 102 may connect over network 106. In general, a web-based collaborative support session is a communication session that is conducted over the Internet, for example, and managed by communication server 104 that presents web-pages to each computer device connected to the same meeting to mimic a collaborative environment in which users can converse in audio, video and electronically share documents, applications, and desktops/screens (i.e., share desktop/screen content) in real-time. The collaborative support sessions also support control of customer computer device 102(1) (e.g., terminal control) by support specialist computer device 102(2). In accordance with embodiments presented herein, communication server 104 also hosts a knowledge extraction application 114 (referred to as "knowledge extractor" 114), which communicates with communication service 112, to extract knowledge from the collaborative support sessions. In other embodiments, all or part of knowledge extractor 114 may be hosted on one or both of computer devices 102.

High-level operations performed by knowledge extractor 114 are described next in connection with FIG. 2. Then, detailed descriptions of the high-level operations are provided in connection with FIGS. 3-8.

Figure 2:
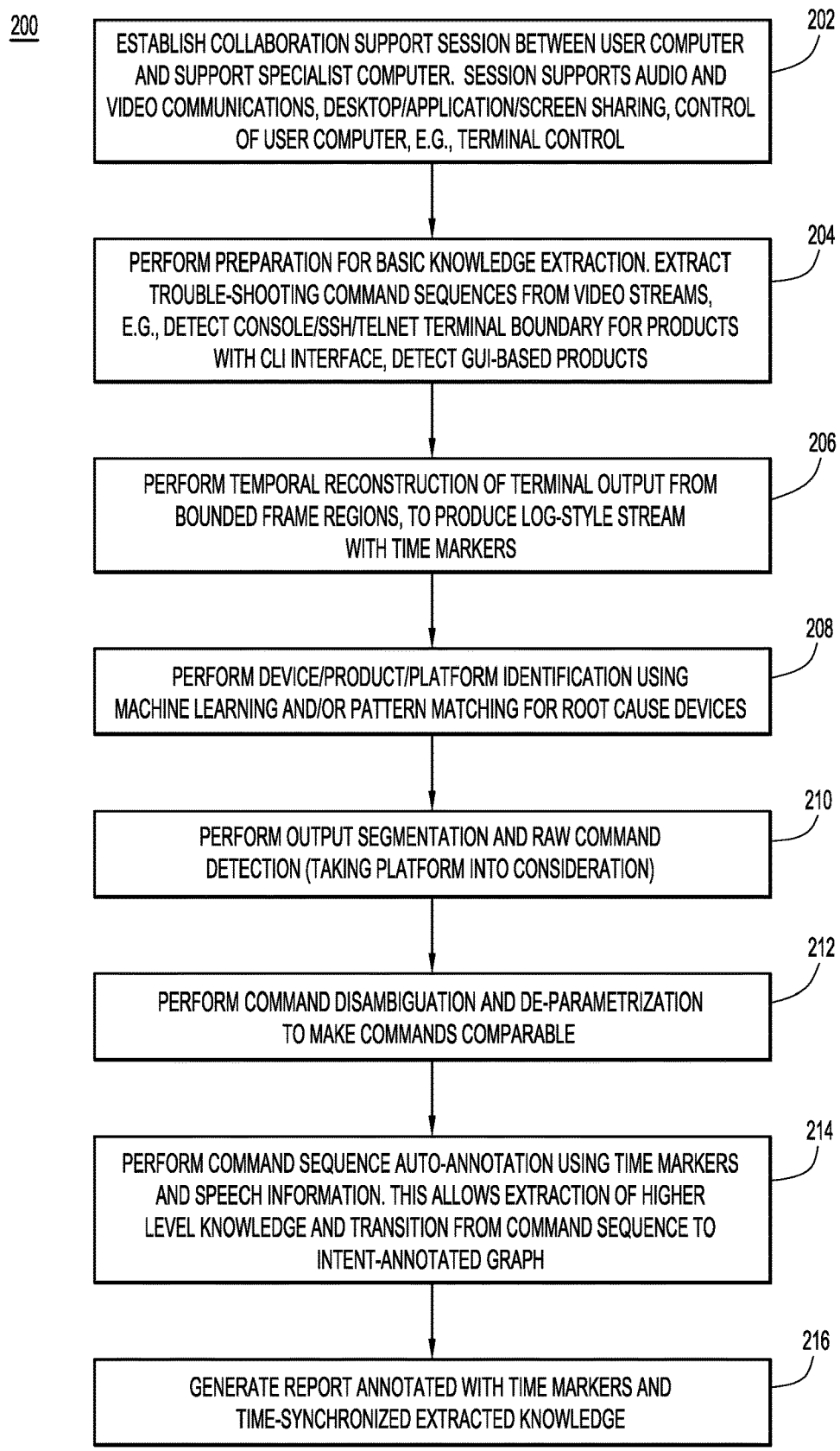
FIG. 2 is a high-level flowchart of a method of extracting knowledge from a collaborative support session, according to an example embodiment.

With reference to FIG. 2, there is high-level flowchart of an example method 200 of extracting knowledge from a collaborative support session. Method 200 may be performed primarily by communication server 104 (via knowledge extractor 114), support specialist computer device 102(2), or both.

At 202, customer computer device 102(1) and support specialist computer device 102(2) connect to the collaborative support session supported by communication server 104. The collaborative support session supports audio and video communications between customer computer device 102(1) and support specialist computer device 102(2), permits desktop/application/screen sharing between the customer computer device and the support specialist computer device, and permits control (e.g., terminal control) of the customer computer device by the supports specialist computer device. The collaborative support session records audio, video, and screen sharing content during the supports session, and also periodically timestamps each type of the recorded information, i.e., inserts timestamps (also referred to as "time markers") that increase over time into the recorded information. The recorded information and timestamps are accessible to knowledge extractor 114.

At 204, knowledge extractor 114 prepares for knowledge extraction from the collaborative support session. Primarily, knowledge extractor 114 extracts troubleshooting command sequences from video streams shared between support specialist computer device 102(2) and customer computer device 102(1). To do this, knowledge extractor 114 may detect console/Secure Shell (SSH)/telnet terminal boundaries when customer computer device 102(1) uses a command line interface (CLI), or may detect graphical user interface (GUI)-based objects when the customer computer device uses a GUI. Results from operation 204 are stored for subsequent processing.

At 206, knowledge extractor 114 performs temporal reconstruction of an entire terminal (e.g., screen) output from customer computer device 102(1) based on bounded frame regions, to produce a log-style text stream with timestamps. The log-style text stream (also referred to as a "text log") with timestamps is stored for subsequent processing.

At 208, knowledge extractor 114 performs device/product/platform identification of customer computer device 102(1). This may employ use of machine learning and/or pattern matching to determine the root cause devices, i.e., customer computer device 102(1) and/or customer equipment 103(2), under inspection during troubleshooting. Alternatively, identification information for the root cause devices under inspection may be accessed from a database or entered by a support specialist or customer, if known. The device/product/platform identification information is stored for subsequent processing.

At 210, knowledge extractor 114 performs output segmentation and raw command detection using machine learning on the log-style text steam, taking identification information from 208 into consideration. This produces a command sequence including (identifiable) individual/separated (text) commands and command parameters associated with the commands, with timestamps. The command sequence is stored for subsequent processing. As used herein, a "command" includes, but is not limited to, a command that elicits a specific response (e.g., causes a specific action, invokes a specific task, produces a specific output, and so on), and an instruction that enables printing/outputting of debug information, such as "debug" and "log."

At 212, knowledge extractor 114 performs domain specific command disambiguation and de-parametrization to make the commands comparable. Results of operation 212 are stored for subsequent processing.

At 214, knowledge extractor 114 performs command sequence auto-annotation using timestamps and speech information. This allows higher level knowledge to be extracted from the command sequence, and also allows a transition from the command sequence to an intent-annotated graph. Results from operation 214 are stored for subsequent processing.

At 216, based on results from 214, knowledge extractor 114 generates a text searchable report annotated with timestamps and time-synchronized extracted knowledge.

Various ones of operations 204-216 are now described in further detail.

Figure 3:
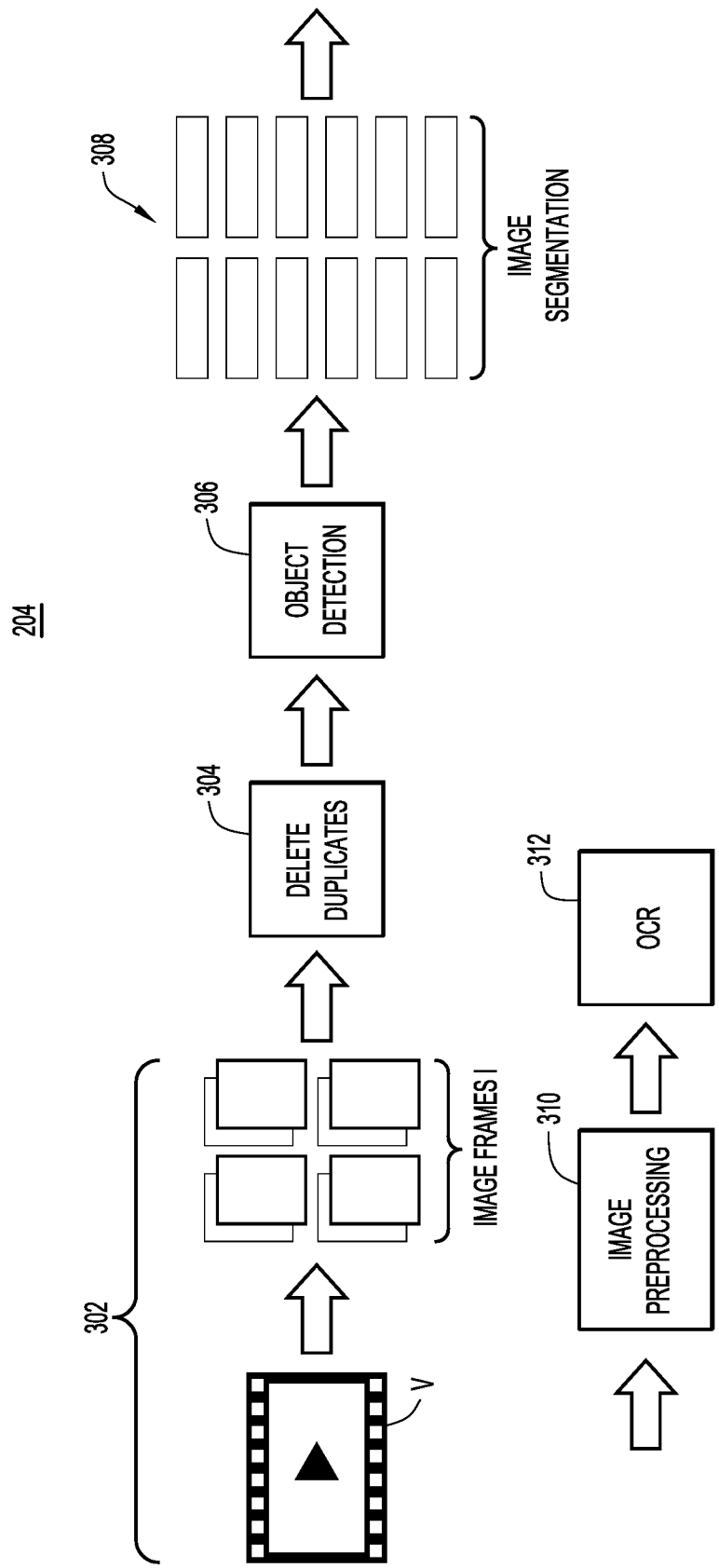
FIG. 3 shows operations expanding on an operation to prepare for knowledge extraction introduced in the method of FIG. 2, according to an example embodiment.

With reference to FIG. 3, there are shown operations expanding on operation 204, from screen sharing to image segmentation, to produce basic knowledge for subsequent analysis.

At 302, frame separation and "cleaning" is performed. Image frames I are extracted from a video stream V of screen sharing content every t milliseconds (ms). In an example, t=1000 ms. This may be performed using any known or hereafter developed utility for performing image frame extraction, such as an Open Source Computer Vision (OpenCV) library.

At 304, duplicate image frames are removed from the extracted image frames.

At 306, object detection is performed on the image frames as de-duplicated to find terminal boundaries. Objects on screen, such as standard icons, bars, and so on, are excluded from images to provide consistent noiseless results. Deep learning technologies may be used, including Regions-based Convolution Neural Networks (R-CNN), Regions-based Fully Convolution Networks (R-FCN), and Single Shot Multibox Detector systems (SDD).

At 308, image segmentation is performed to convert each image present on the image frames as de-duplicated into multiple images, with each image containing lesser text information than a previous image. The amount of text presented on an image is inversely proportional to the text accuracy via optical character recognition (OCR) models. For videos on a full-screen terminal, containing small characters in every line, image segmentation can dramatically improve OCR text-recognition accuracy, as shown in FIG. 4.

Figure 4:
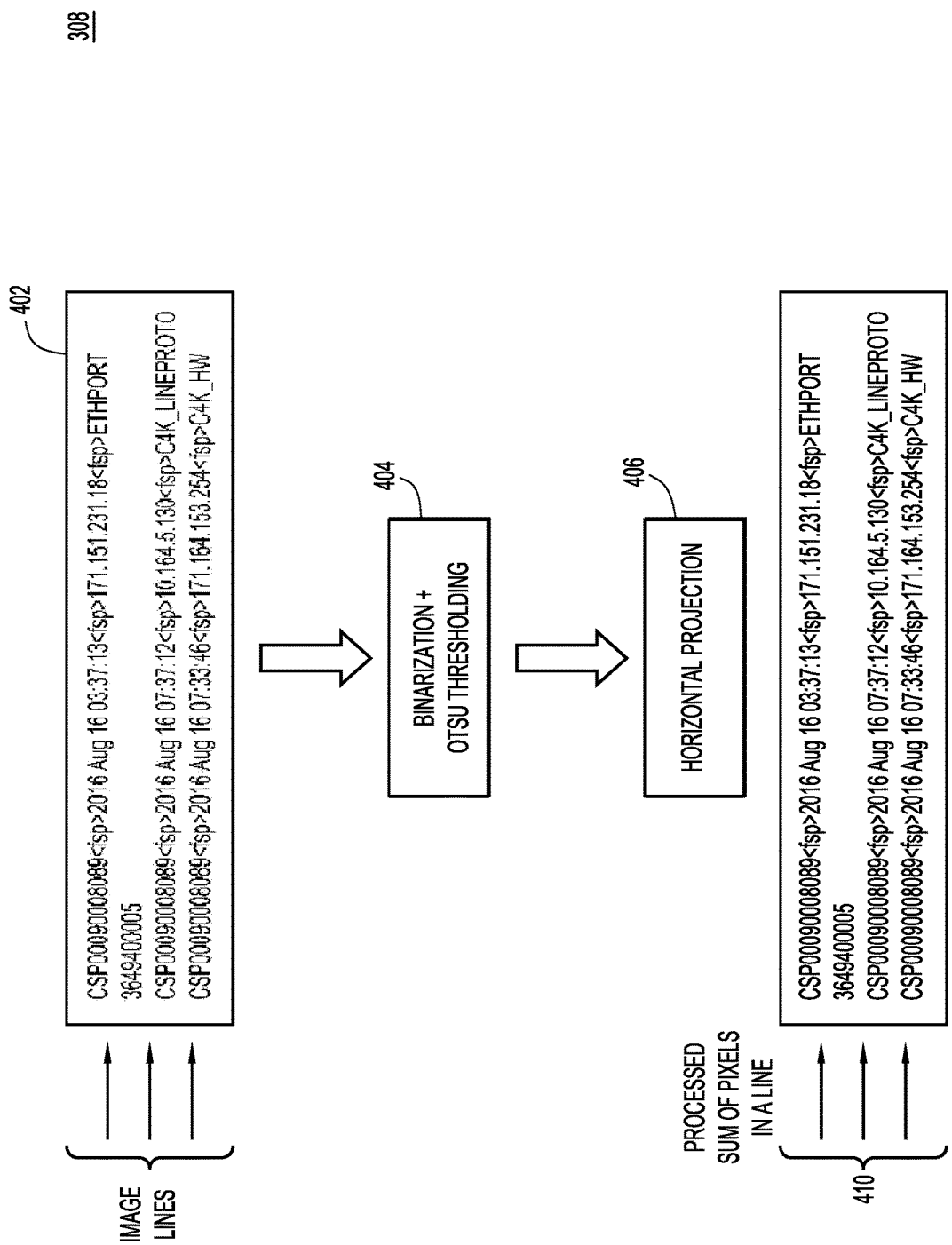
FIG. 4 shows operations expanding on an image segmentation operation introduced in FIG. 3, according to an example embodiment.

With reference to FIG. 4, there are shown example operations expanding on operation 308 that are used for image segmentation. To cut an image 402 into lines (i.e., to segment the image), horizontal pixel histograms are calculated and used to find local minimums. For example, operation 404 (including binarization and Otsu thresholding—i.e., converting a grayscale image to monochrome) followed by operation 406 (horizontal projections) may be used to produce segmented lines 410, which are more suitable for OCR than original lines in image 402.

Referring back to FIG. 3, at 310, image segments resulting from 308 are processed to improve their quality using (i) resizing of the image segments, e.g., by 10 times (using bi-cubic interpolation), (ii) adding boundaries (e.g., 5 pixels each side), and (iii) reducing noise using non-local mechanisms. The result of the segmentation and preprocessing pipeline are fed to operation 312.

At 312, the image segments resulting from 310 are converted to text using OCR, e.g., using a Tesseract engine for OCR.

Returning to FIG. 2, temporal reconstruction as performed in operation 206 is now described. Operation 206 performs temporal reconstruction from window-sized image frames, to produce a log-style text stream with timestamps. The following is an example of a log-style text stream with timestamps:

Sep 24 10:34:13 GMT+3: %LINK-3-UPDOWN: Interface GigabitEthernet0/28, changed state to up Sep 24 10:34:15 GMT+3: %LINEPROTO-5-UPDOWN: Line protocol on Interface GigabitEthernet0/28, changed state to up Sep 24 10:34:33 GMT+3: %LINEPROTO-5-UPDOWN: Line protocol on Interface GigabitEthernet0/28, changed state to down Sep 24 10:34:34 GMT+3: %LINK-3-UPDOWN: Interface GigabitEthernet0/28, changed state to down During collaborative support sessions, very often, presenters (e.g., customers and/or support specialists) scroll text up and down on their respective screens and often correct themselves by deleting characters they have typed into their terminals to make new changes. To decode correct text that finally worked for them, i.e., the text that was employed successfully in the troubleshooting process, it is important to keep track of embedded temporal information and reconstruct that information in a meaningful format, such as a log-stream of text.

Operation 206 captures the above-mentioned information without losing or repeating data. To do this, operation 206 combines OCR text results together in a proper order, and uses an edit distance-based algorithm to join multiple frame texts into one document or text line. Edit distance is a way of quantifying how dissimilar two text strings are to one another by counting a minimum number of operations required to transform one text string into the other text string. Also, by comparing adjacent texts, an overlap between the texts can be determined and used to reconstruct an original text, as shown in FIG. 5.

Figure 5:
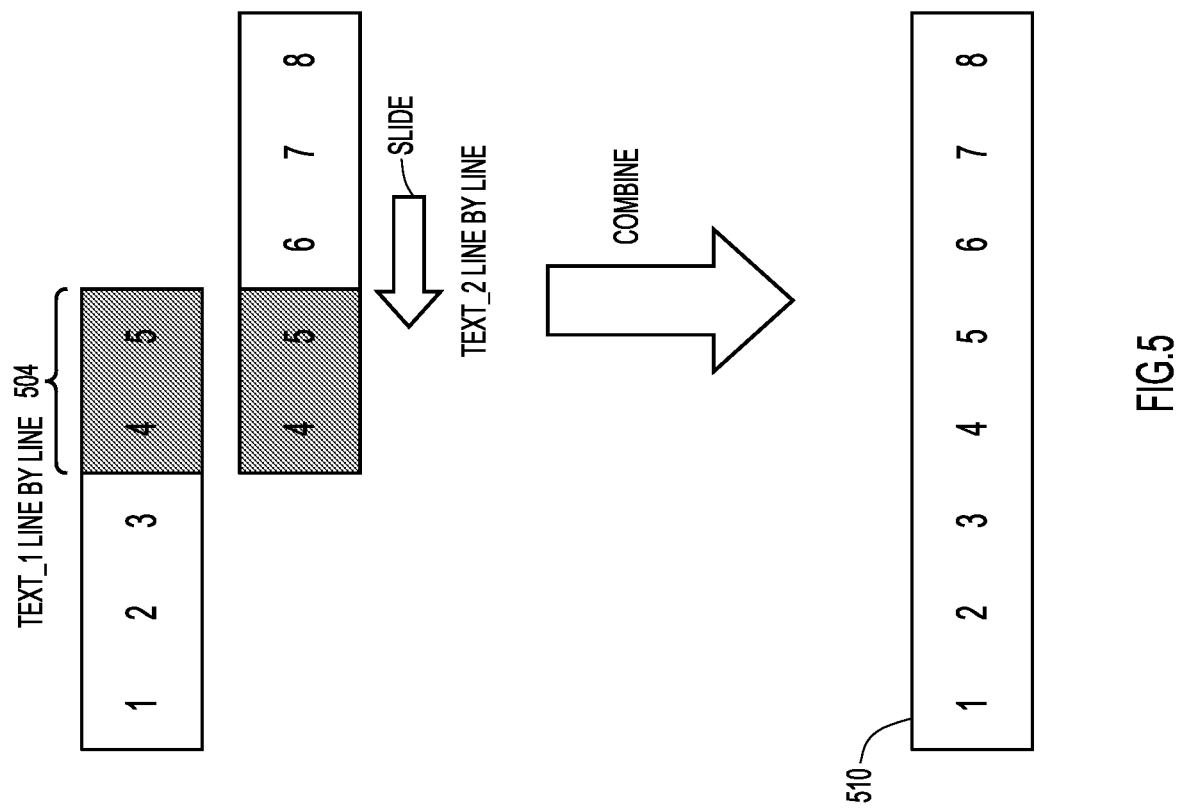
FIG. 5 is an illustration of operations to construct effective sequences used in a temporal reconstruction operation introduced in the method of FIG. 2, according to an example embodiment.

With reference to FIG. 5, there is an illustration of constructing effective sequences in operation 206 using the above-mentioned techniques. As shown in FIG. 5, operation 206 slides text line text_1 with respect to text line text_2 to find a common text overlay 504. Then, operation 206 combines the two text lines into a combined text line 510 that omits duplicating the common overlay.

Returning again to FIG. 2, device/product/platform (collectively referred to as "platform") identification as performed at operation 208 is now described. To help extract knowledge from the collaborative support session, operation 208 identifies the platform under inspection during the collaborative support session. Often, many platforms may be analyzed and diagnosed during the collaborative support session. So, to discover a root cause of an issue, it is helpful understand which devices were under inspection (i.e., referenced) and when they were under inspection. Different platforms may be associated with the same "literal" commands, but the commands may convey drastically different meanings, and hence may have surprisingly varied effects, depending on the specific platforms on which the commands are executed or employed. Additionally, different commands may be required to achieve the same result on different platforms.

Hence, operation 208 identifies platform information, including, e.g., product family, operating system type, software and/or hardware version. A semantic assumption here is that different platform (or product) families use respective sets of commands, and that similar/same commands used across the different platforms, e.g., "show interface," may have different appearances and different meanings depending on the platform. For example, one platform may be "router," and another other may be "switch," which may execute different operating systems; however, both platforms may use similar commands, "show interface," "show log," "show version," which may lead to different responses depending on the platform.

Platform identification information may be available/discoverable from several places. For example, some commands may indicate a platform and version. In this case, "pattern matching" may be leveraged, where patterns in text output by customer computer device 102(1), as a result of executing a specific command on the customer computer device, may identify the platform. The following are examples of platform identification provided in responsive to various commands:
Router#show version
  Cisco IOS Software, 1841 Software (C1841-ADVIPSER-VICESK9-M), Version 12.4(15)T1, RELEASE SOFTWARE (fc2)
  . . .
  Cisco 1841 (revision 5.0) with 114688K/16384K bytes of memory.

Processor board ID FTX0947Z18E M860 processor: part number 0, mask 49
2 FastEthernet/IEEE 802.3 interface(s)
191K bytes of NVRAM.
63488K bytes of ATA CompactFlash (Read/Write)
sw3550_01#sh inv
NAME: "sw3550_01", DESCR: "Cisco Catalyst 3550 24 10/100 baseT ports+2 Gig upl
Links fixed configuration Layer 2/3 Ethernet Switch"
PID: WS-C3550-24-SMI, VID: L0, SN: CAT0812N33C Operation 208 may also perform a binary classification to predict which platform is under inspection. Alternatively, platform identification may store in a databases and accessed by knowledge extractor 114.

Output segmentation and raw command detection using machine learning as performed in operation 210 is now described. The log-style text stream with timestamps resulting from operation 206 represents a mixed log. That is, the text stream includes commands, command parameters associated with the commands, system responses/outputs to the commands (also referred to as "command output"), and periodic timestamps. Operation 210 uses machine learning, and the platform identification information from operation 208, to identify individual commands and command parameters in the log-style text stream from operation 206. For example, the machine learning finds points of separation, such as command prompts, between successive commands, and predicts which command will follow the command prompt.

During the collaborative support session, the participants (e.g., the customer and the support specialist) attempt different commands based on their technical knowledge. Based on responses/results of the commands, the participants continue based on further assumptions and verification paths. Thus, the commands have or follow a coherent context, e.g. knowledge graph, not a random path. A well-trained support specialist attempts commands that have a topical structure and follow a particular high-level logic. The actual command choices and their transitions from one-to-the next based on their individual outcomes come together to convey an overall purpose of a given troubleshooting experiment. Knowledge extractor builds machine learning models that can learn such structure by arranging a given set of commands to make coherent text.

Figure 6:
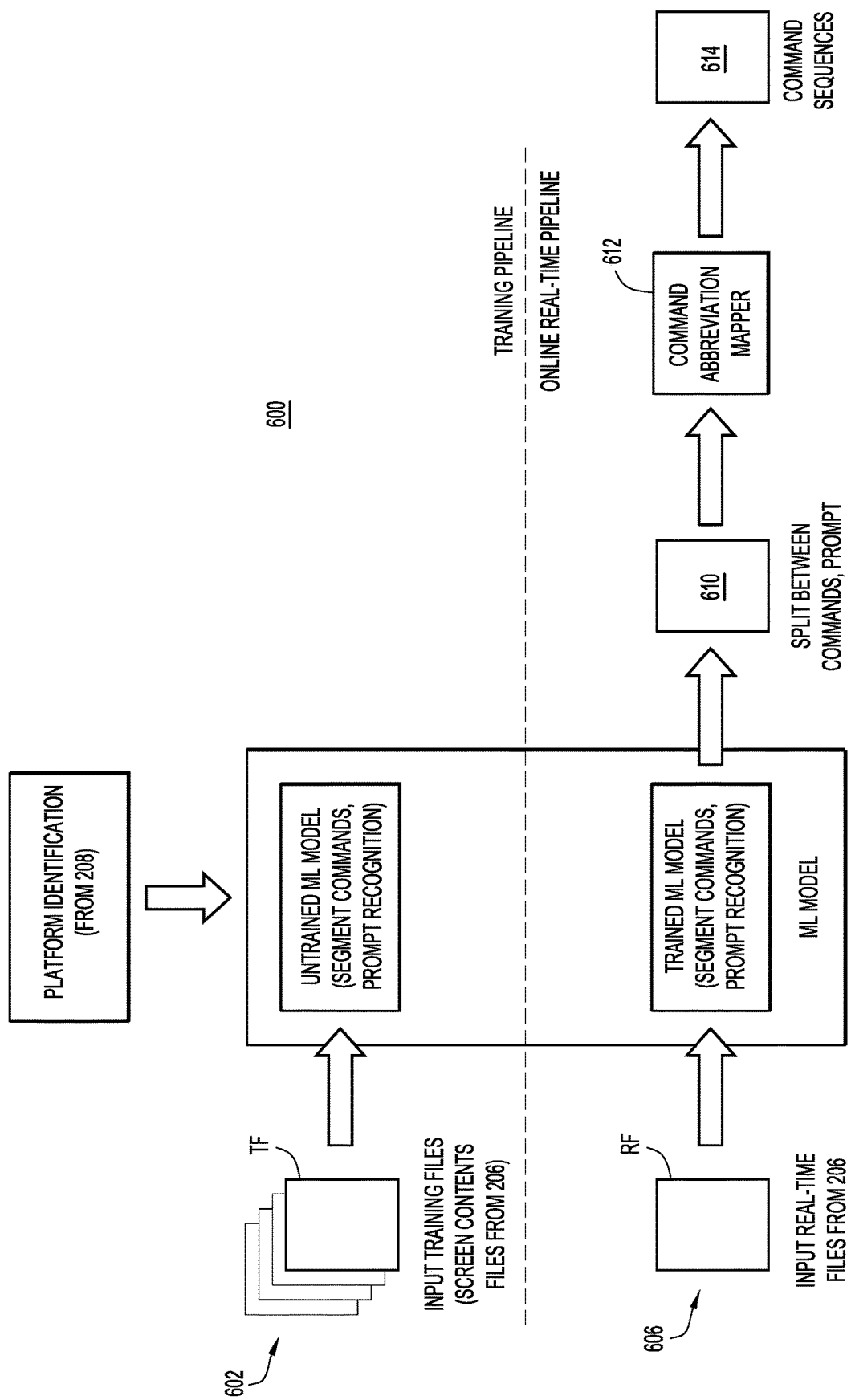
FIG. 6 is an illustration of a machine learning (ML) process used in an output segmentation and raw command detection operation introduced in the method of FIG. 2, according to an example embodiment.

With reference to FIG. 6, there is an illustration of an example machine learning (ML) process 600 used by operation 210. ML process 600 includes a training stage 602 to train a ML model, and an online real-time stage 606 that uses the trained ML model.

At 602, training files TF and the platform information from operation 206 are provided to the ML model in its untrained state. The training files TF may include a variety of artificial and/or actual log-style text streams as produced in operation 206, for the platform identified by the platform information. The log-style text streams of the training files TF include sequences of command prompts, commands, command parameters, and system responses to the commands (i.e., command output). The ML model is a command-based model that trains on the training files TF for the given product information, to recognize/identify (i) boundary points of commands, e.g., to recognize command prompts, (ii) commands, and (iii) command parameters. Thus, the ML model learns prompt recognition used to segment commands, and also learns various commands, and parameter formats. Once the commands and command parameters have been identified, knowledge extractor 114 performs further processing of the log-style text stream to identify the command output and separate the identified command output form the commands and associated parameters (e.g., the command output includes text that is not identified as the commands and the associated parameters). Thus, the commands, associated parameters, and command output as identified may all be manipulated (e.g., copied, moved, output, tagged, and so on) independent of each other by knowledge extractor 114.

At 606, real-time files RF of log-style text streams from operation 206, and the platform information from 208, are provided to the ML model that was trained at operation 602. The trained ML model generates intermediate results 610 including a sequence of recognized command prompts, commands, and command parameters 610 based on the log-style text streams and the platform information. Many command parsers allow abbreviation commands, such that participants are not forced to type in full commands. For example, the command "show version" is used to display a version of software, but a command parser may support a shortened or abbreviated version "sh ver." The trained ML model may recognize such variations. Alternatively, a command abbreviation mapper 612 may be used to reconstruct full complete commands 614 from abbreviated commands in intermediate results 610.

Returning to FIG. 2, command disambiguation and de-parameterization as performed at operation 212 is now described. There may be multiple instances of a given command in the log-style text stream, and the given command may be presented in different ways. For example, some network devices interpret "sh ver" and "show version" as the same command. Many factors may distinguish one command from another. The factors include command names, command abbreviations, and the number and type formats of command parameters. For example, "sh int e1/15" and "sh int e2/12.2" are the same abbreviated command for "show interface," but have different command parameters.

Conventional tokenization and sentence segmentation cannot support the hidden semantic requirement embedded in domain specific commands. For example, the conventional techniques may not understand the meaning of "sh ver" without a domain language model. Operation 212 uses a domain specific language model to assist with command disambiguation, as shown in FIG. 7.

Figure 7:
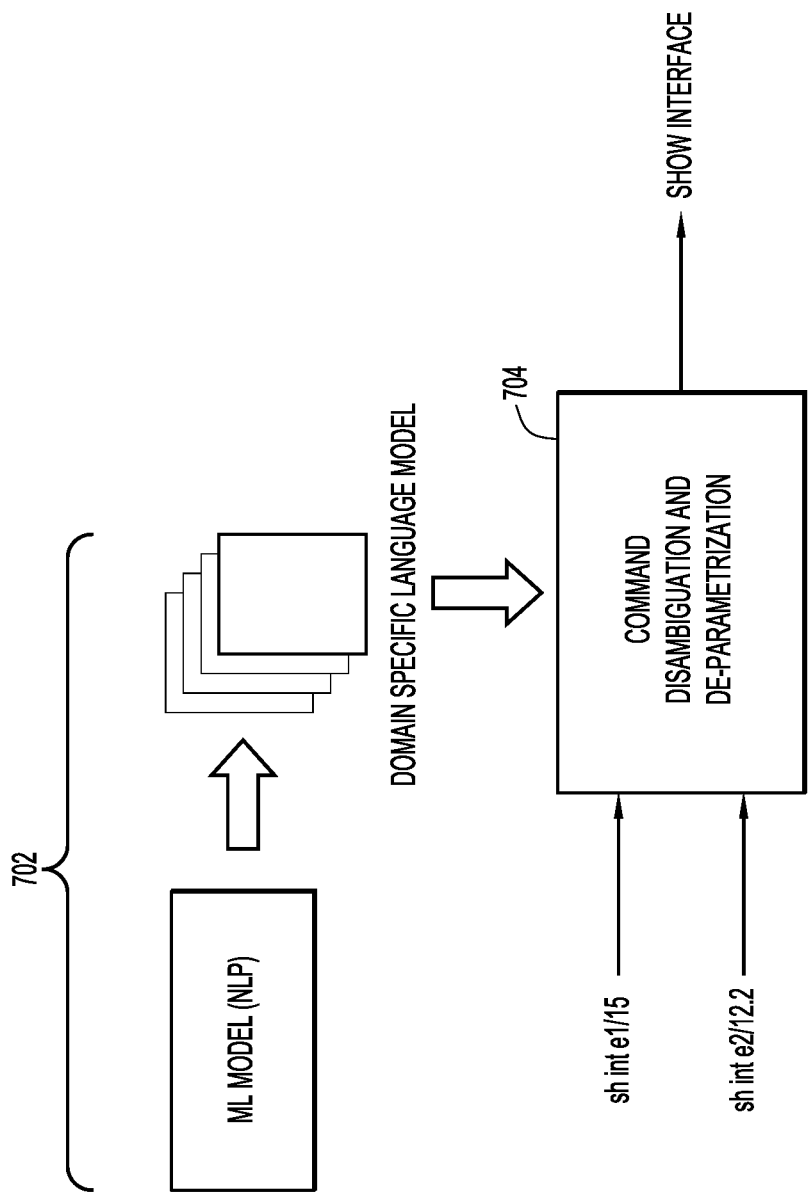
FIG. 7 is an illustration of an example process used for a command disambiguation and de-parametrization operation introduced in the method of FIG. 2, according to an example embodiment.

With reference to FIG. 7, there is shown an example process used for command disambiguation and de-parametrization in operation 212. The command disambiguation and de-parameterization process uses a domain specific ML model 702. As shown in FIG. 7, abbreviated commands "sh int e1/15" and "sh int e2/12.2" from the log-style text stream produced at operation 206, or from intermediate results 610 produced by the trained ML model of FIG. 6, are provided to a command disambiguation and de-parameterization process/module 704. Process 704 uses domain specific ML model 702, which may include natural language processing (NLP), to recognize that the "sh int" commands represent a full complete command "show interface." The command "show interface" is a generalized or normalized command corresponding to the abbreviated version "sh int."

Returning again to FIG. 2, command sequence auto-annotation using timestamps and speech information as performed at operation 214 is now described. During the collaborative support session, the support specialist typically talks with the customer to explain different troubleshooting hypothesis while trying (i.e., typing and executing) various commands in support of the hypothesis on customer computer device 102(1). Sometimes, the hypothesis works, leading to deeper and more relevant deep dive commands. Other times, the hypothesis does not work, necessitating a switch to a next hypothesis. Insights provided by speech in audio cannot be seen from the commands resulting from operations 210 and 212 alone; however, such insights may be gleaned from audio recorded during the collaborative support session, as discussed below in connection with FIG. 8.

Figure 8:
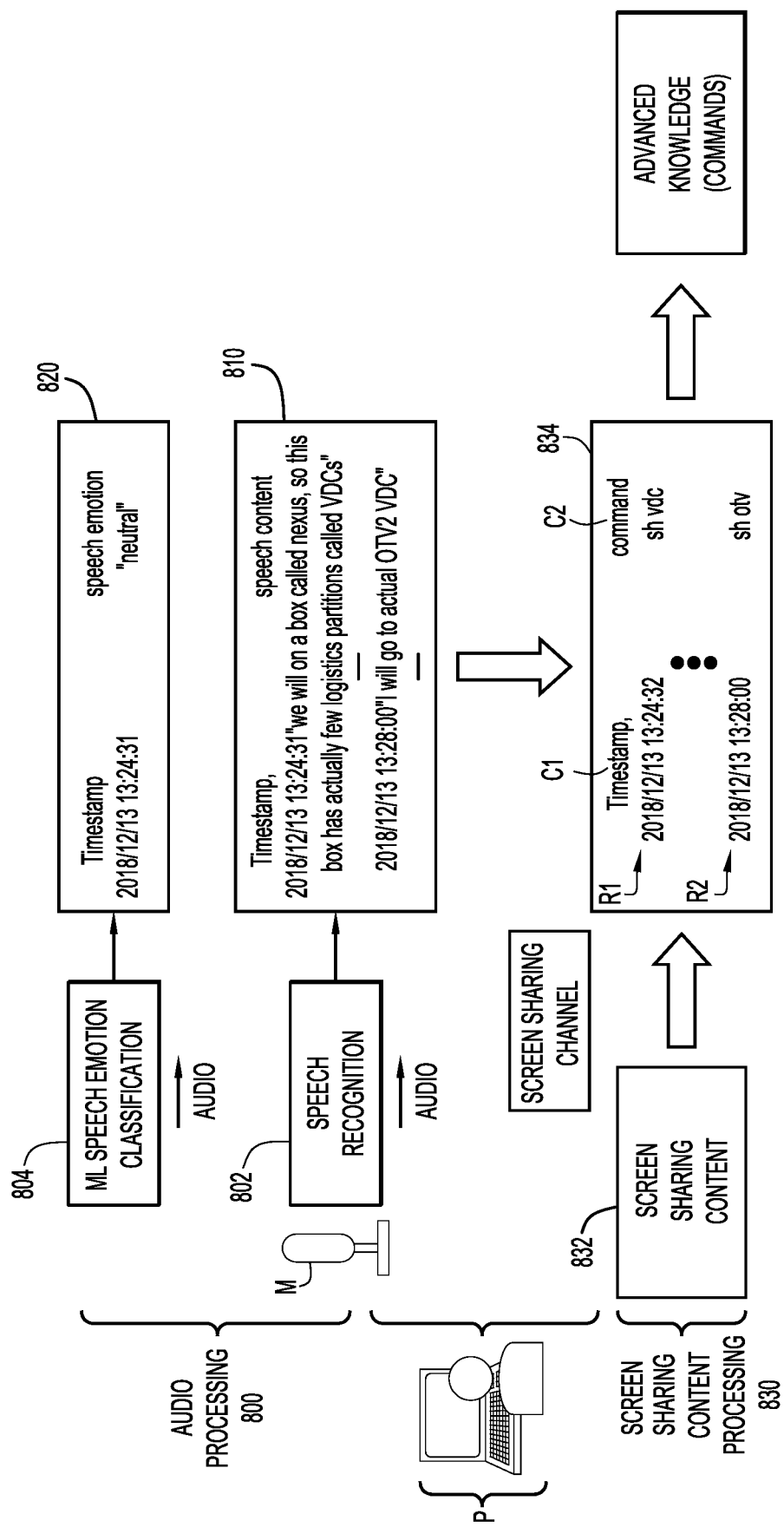
FIG. 8 is an illustration of audio/speech processing performed in a command sequence auto-annotation using time-stamps and speech information operation introduced in the method of FIG. 2, according to an example embodiment.

With reference to FIG. 8, there is an illustration of audio/speech processing 800 performed in operation 214. Audio from a participant P detected by a microphone M is processed in operations 802, 804. The audio may be live/realtime audio detected by microphone M, or may be audio that is played back from an audio transcript of previously recorded audio.

At operation 802, speech recognition is performed on the audio to convert speech in the audio to text (referred to herein as "speech-to-text" and "speech text") with timestamps. Any known or hereafter developed speech-to-text conversion technique may be used in operation 802. Operation 802 may produce a text record or text file 810 including snippets or segments of speech-to-text with corresponding timestamps.

At operation 804, an ML speech emotion classifier operates on the audio, to classify the speech in the audio into one of several possible emotion classifications, such as excitement, frustration, happiness, neutral, and sadness. Any known or hereafter developed ML speech emotion classifier technique may be use in operation 804. Operation 804 may produce a text record or file 820 including a speech emotion classification with a corresponding timestamp. In the example of FIG. 8, text record 820 indicates a speech emotion "neutral" that corresponds to the speech-to-text stored (speech) text file 810, based on matching timestamps in the text records 820 and 810. That is, the emotion "neutral" is time-synchronized to a top row of speech-to-text shown in text record 810. In addition to speech recognition and emotion classification, the audio may be analyzed to detect/identify demarcating sounds (with timestamps) that help demarcate commands. Such sounds may include "beep" and control codes such as the BEL character. The demarcating sounds with timestamps may be used for time-synchronizing audio information with commands, and other information.

FIG. 8 also shows screen sharing content processing 830 that may be combined with the audio/speech processing 800, to produce time-synchronized, extracted knowledge for speech and screen content. Screen sharing content processing 830 receives screen sharing content 832 as an input. Operations 204-212 process the screen sharing content as described above, to produce a text record or file 834 that includes a listing of command entries/rows R1-RN. Each row Ri includes a first column C1 for a timestamp and a second column C2 for a command corresponding (i.e., time-synchronized) to the timestamp. As seen from text records 810, 820, and 834, the speech-to-text "we will on a box called nexus, so this box has actually few ... VDCs" in text record 810, the speech emotion "neutral" in text record 820, and the command "sh vdc" in text record 834 all have the same timestamp and are, therefore, time-synchronized. The screen sharing content itself may be recorded into a text record with a timestamp, and synchronized with text records 810, 820, and 834.

As time progresses during a collaborative support session, knowledge extractor 114 may time-synchronize (i) the commands and associated parameters repeatedly produced at operations 210 and 212, (ii) the audio information (including the text-to-speech and the emotion classifications) repeatedly produced at operations 214, and (iii) as recorded shared screen shots, based on the timestamps of the commands and associated parameters, the audio information, and the screen shots. To do this, knowledge extractor 114 identifies commands and associated parameters, audio information, and screen shots that have matching timestamps within a matching tolerance, which may be exact, or may be within a predetermined time range, e.g., 100 ms, 500 ms, 1 second, and so on. Commands and associated parameters, audio information, and screen shots that have matching timestamps are considered time-synchronized. Knowledge extractor 114 may generate a report including a list of entries, where each entry respectively includes an entry timestamp, commands and associated parameters, audio information, and screen shots that are synchronized to (i.e., have timestamps that match) the entry timestamp. The report may include many entries that have increasing entry timestamps and that record the extracted knowledge synchronized to the entry timestamps.

Extracted knowledge examples that combine results from audio processing and screen sharing for various troubleshooting scenarios are described below in connection with FIGS. 9-11.

Figure 9:
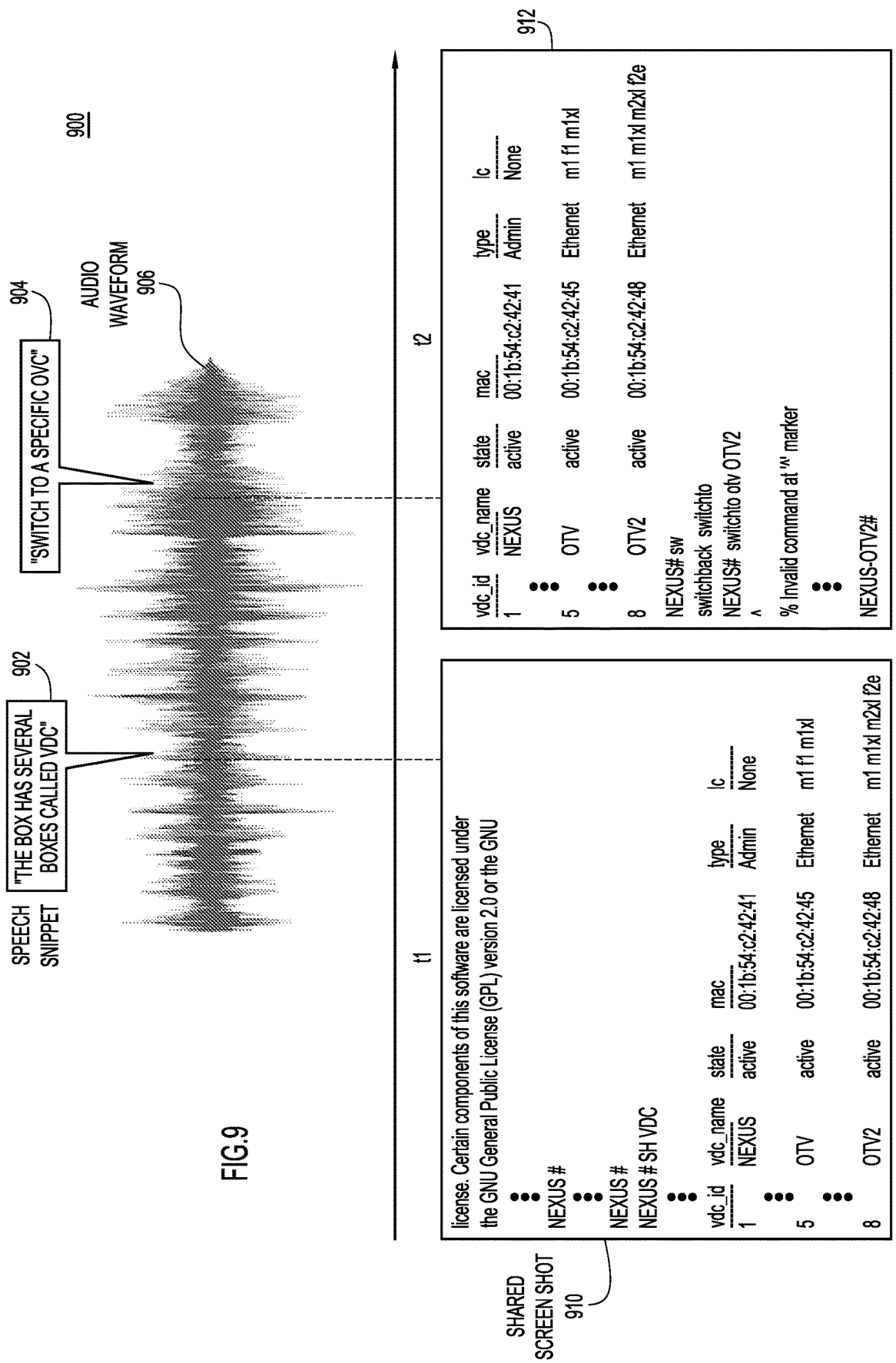
FIG. 9 is an illustration of extracted knowledge for a collaborative support session, according to an example embodiment.
Figure 10B:
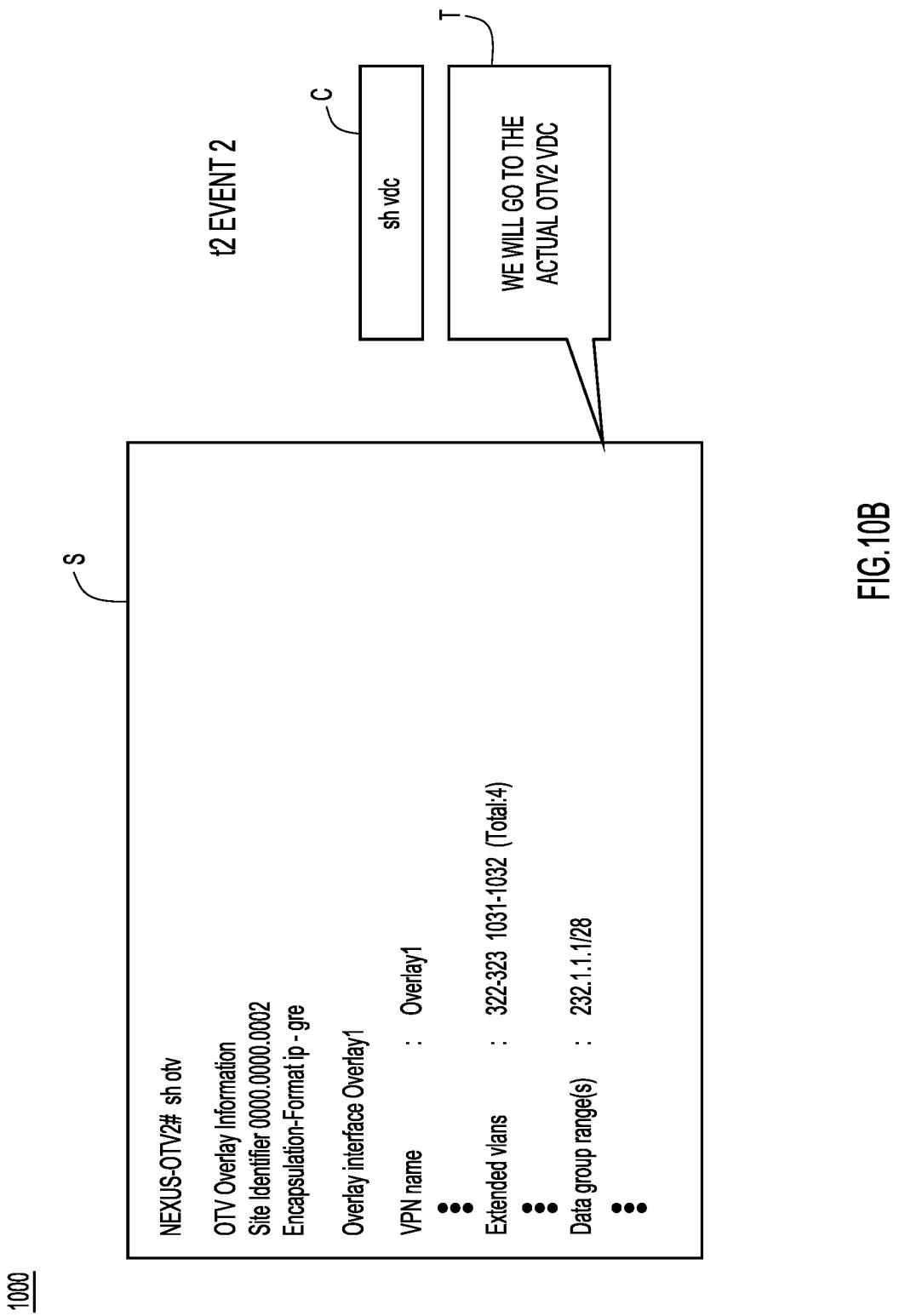
Figure 10C:
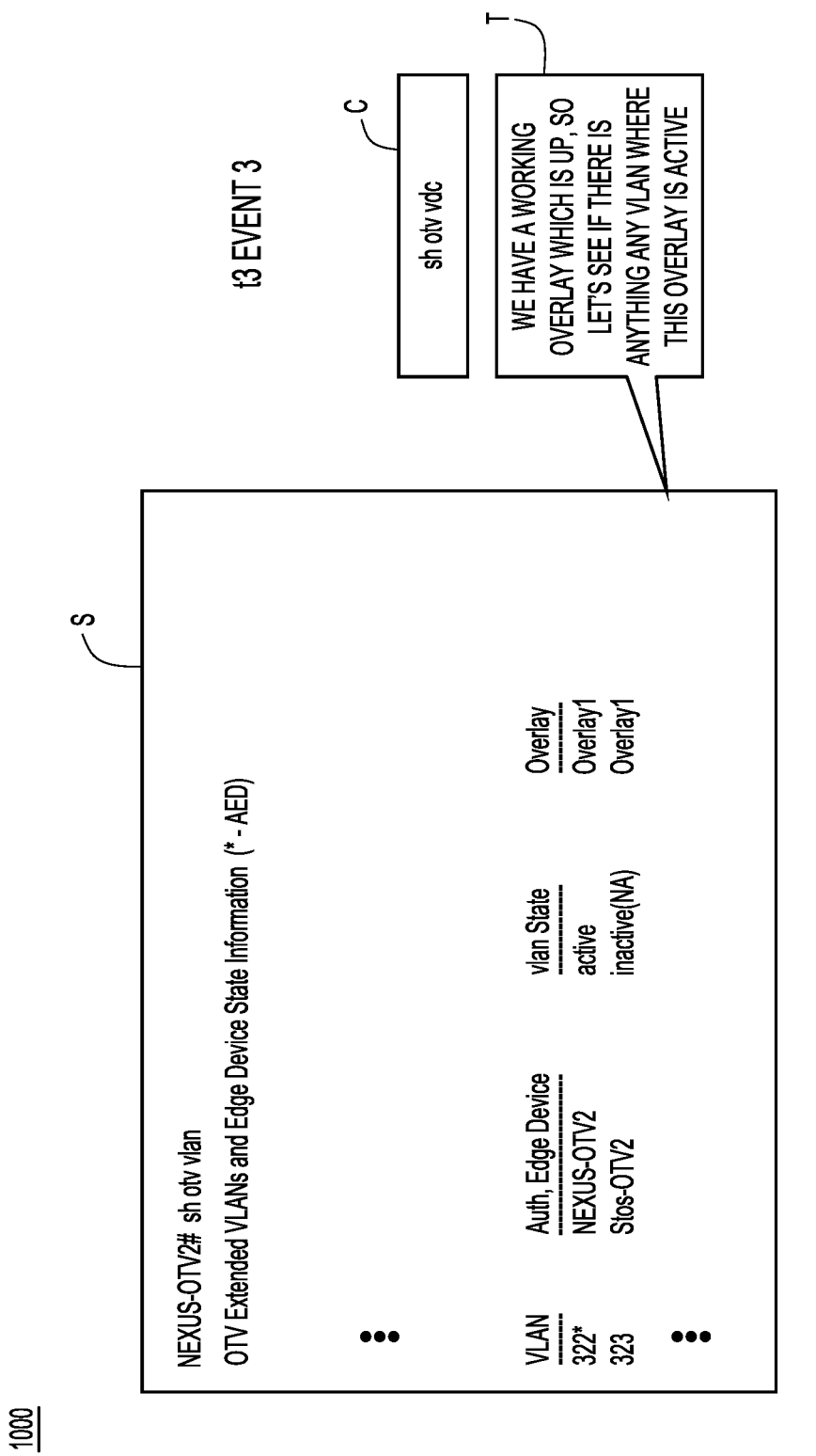
Figure 10D:
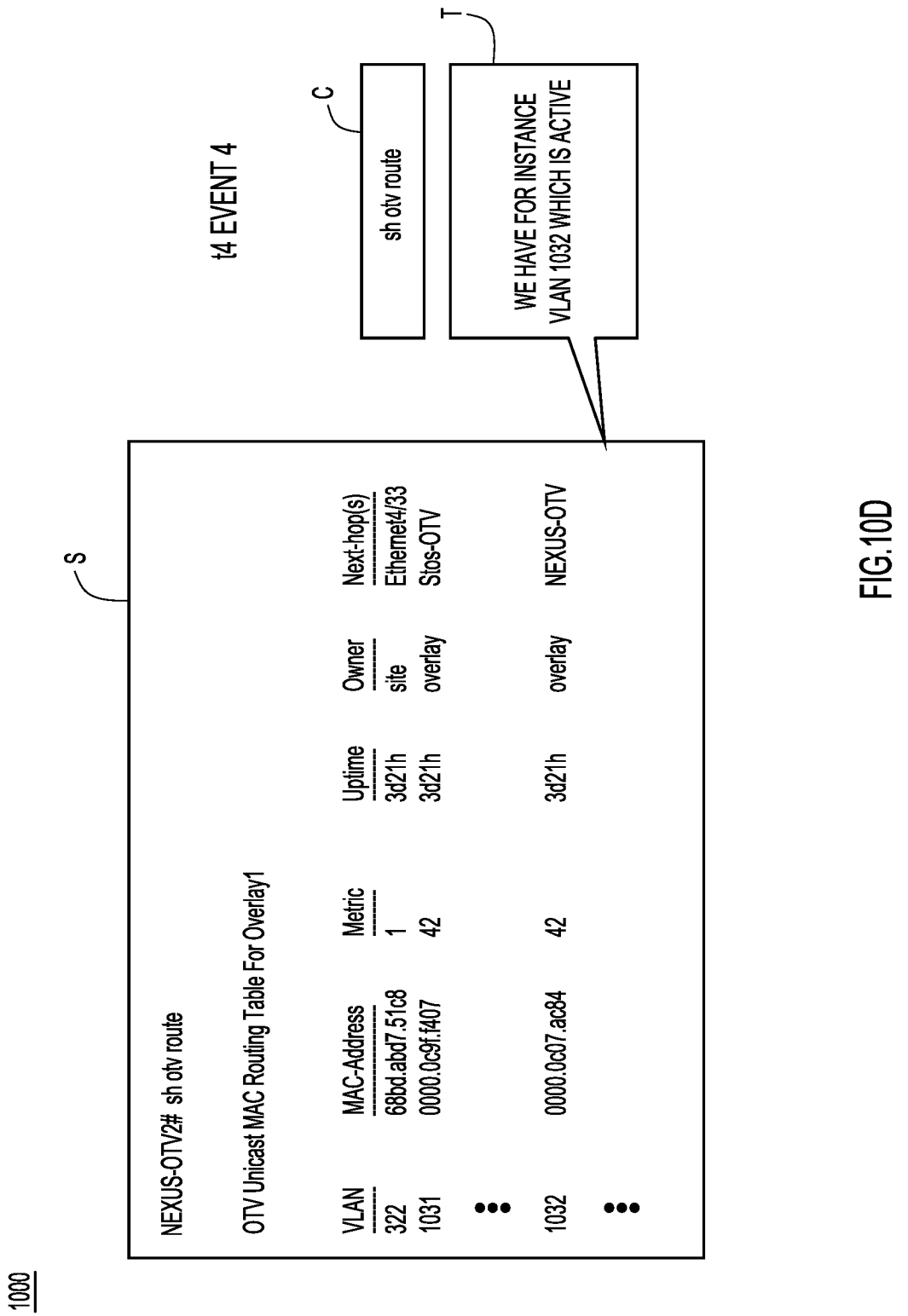
Figure 11A:
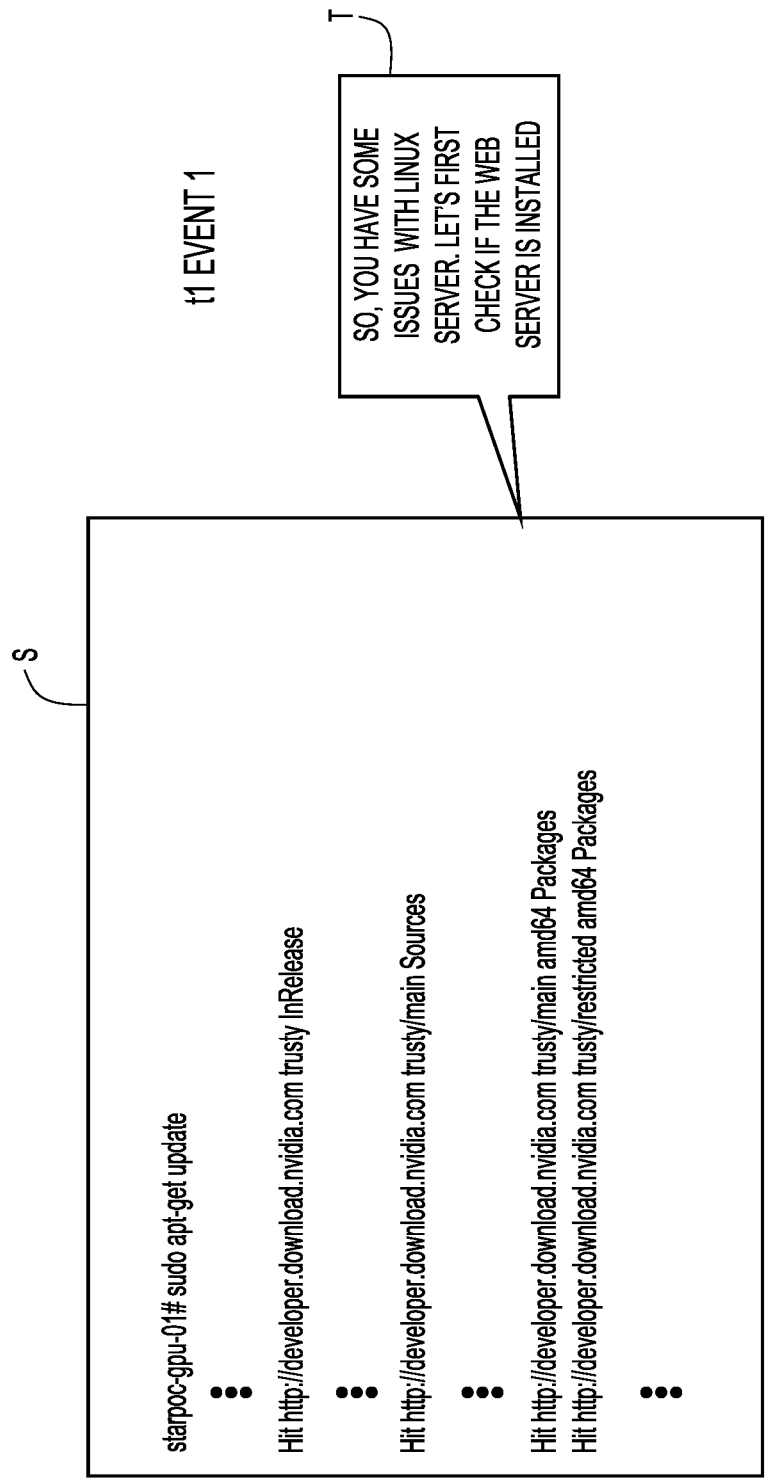
Figure 11B:
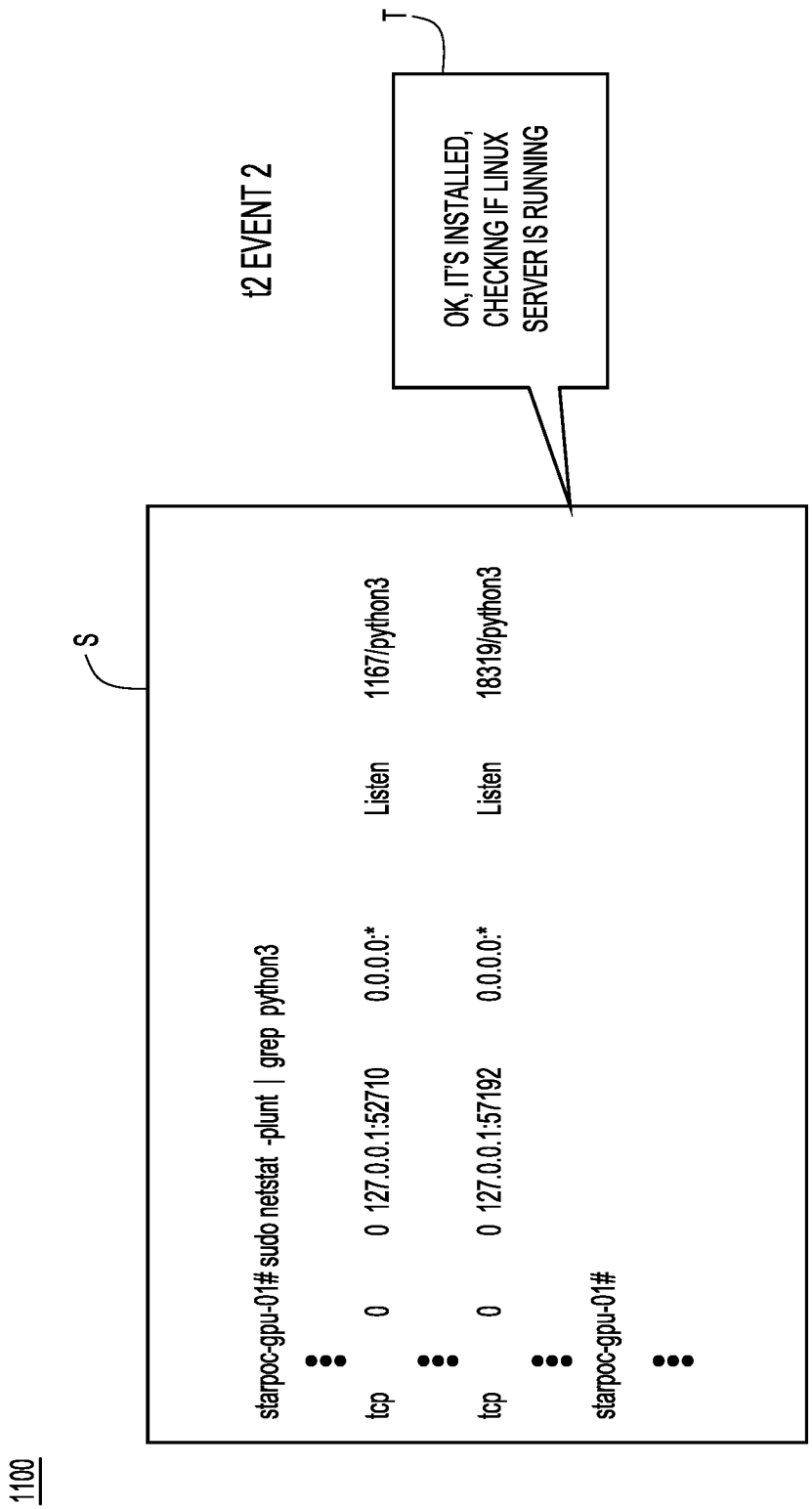
Figure 11C:
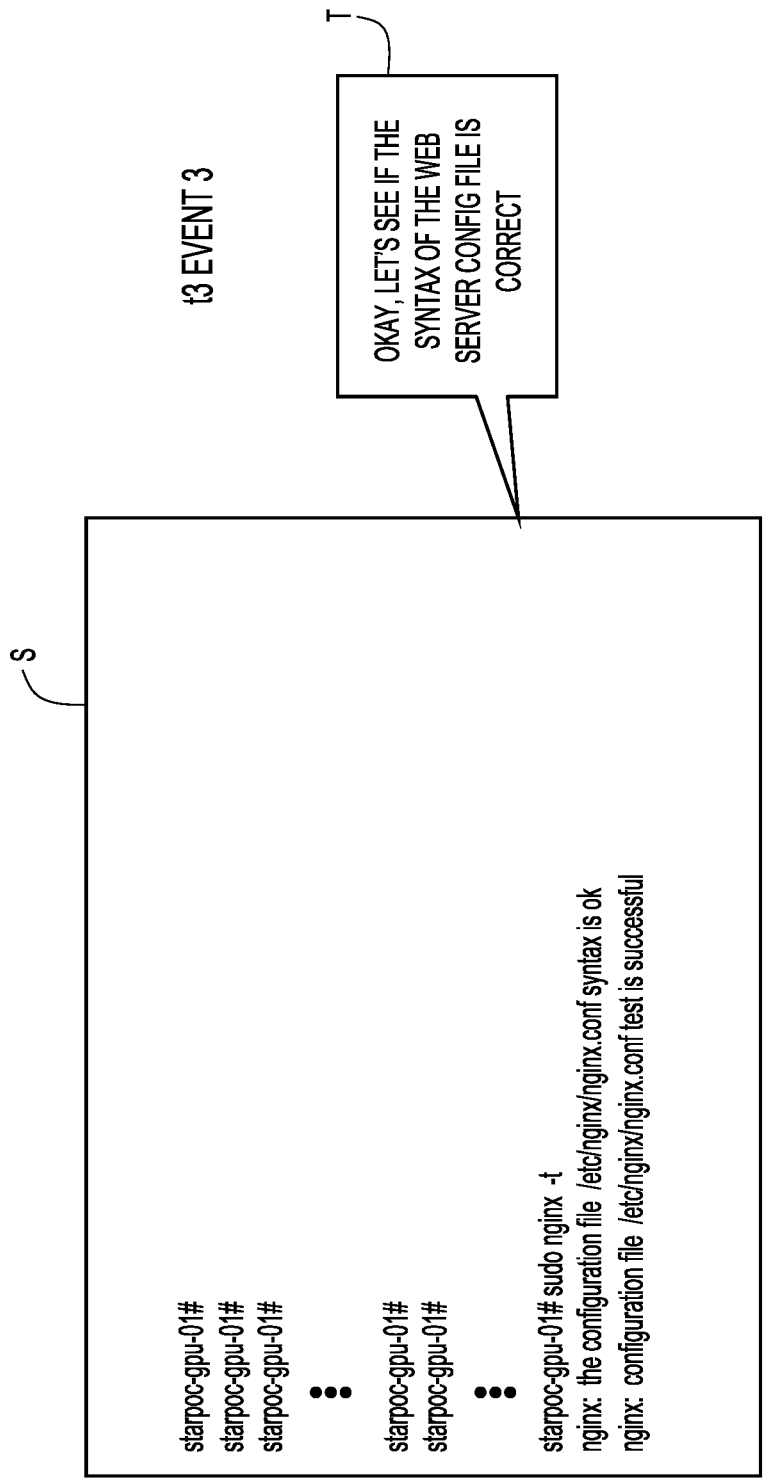
Figure 11D:
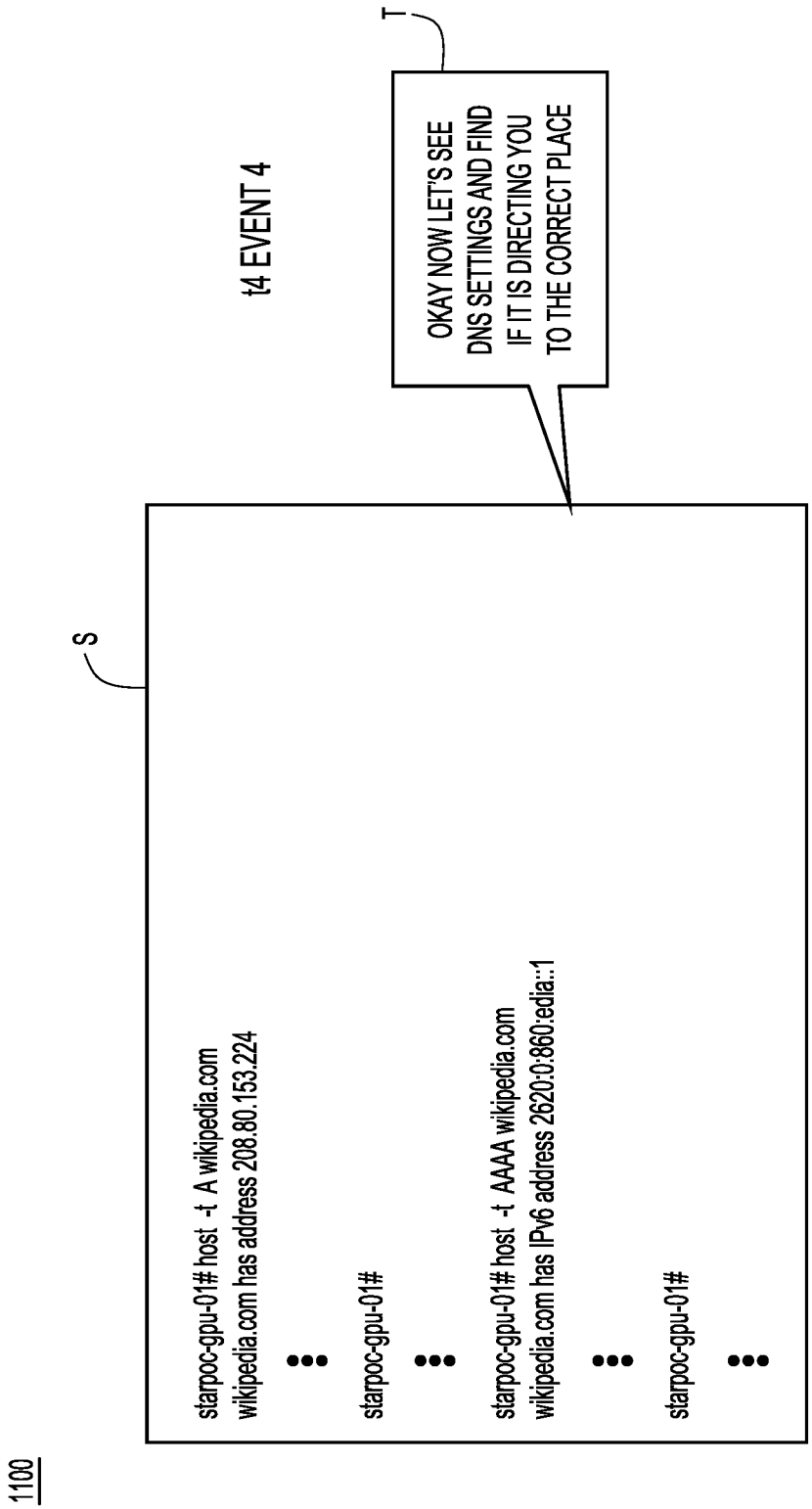

With reference to FIG. 9, there is an illustration of example extracted knowledge 900 for a collaborative support session. Extracted knowledge 900 includes a first speech-to-text snippet or segment 902 with a timestamp t1 stored in a file, and a second speech-to-text snippet or segment 904 with a timestamp t2 stored in the file. Speech-to-text snippets 902 and 904 are extracted from an audio waveform 906, which may or may not be stored in the file. Extracted knowledge 900 also includes a first shared screen shot 910 with the timestamp t1 stored in the file, and a second shared screen shot 912 with the timestamp t2 stored in the file. Thus, screen shots 910, 912 are time-synchronized with speech-to-text snippets 902, 904, respectively.

Another important troubleshooting heuristic includes specific screen selection (e.g., a section of a screen that is colored or highlighted due to a selection of that section), which may be important indicators for effective knowledge extraction. Results from selection and edit operations, such as copy and paste, are the most common results from screen-related operations that participants find interesting/useful, and wish to emphasize and dive into further. For example, a participant may copy a portion of an interface name from "sh interface" and then paste that portion as "sh controllers interface <name>"—this construction of the troubleshooting flow may provide important knowledge; its is essentially an annotation of a $1^{st}$ command with a $2^{nd}$ command. Using a combination of speech and dialogue, as well as the heuristic for screen selection and edit operations, a participant may easily detect dead ends, solid progress, backtracking, clarification, problem identification and solution verification. FIGS. 10A-10D and 11A-11E show examples of the foregoing. In addition to edit operations, annotations of commands and command output (e.g., arrows or other types of annotations provided by the collaboration environment) can help identify commands and command output.

FIGS. 10A-10D collectively illustrate an example of extracted knowledge 1000 for a collaborative support session used to troubleshoot a network application. Extracted knowledge 1000 includes a recorded time-ordered sequence of extracted knowledge events 1, 2, 3, and 4 at times t1, t2, t3, and t4 illustrated at FIGS. 10A, 10B, 10C, and 10D respectively. The extracted knowledge for each event includes a respective set of extracted knowledge components, including a speech-to-text snippet T, a command C, and a screen shot S (which may include a screen selection) all time-synchronized with one another for the given event.

In the collaborative support session corresponding to extracted knowledge 1000, a support specialist is speaking and explaining a main idea to a customer, and the corresponding commands/results attempted/seen by the support specialist and the screen sharing content are synchronized with the troubleshooting progress. The sequence of troubleshooting events includes the following. At event 1 (shown in FIG. 10A), to verify operation of a feature called Overlay Transport Virtualization (OTV) on a Nexus device, support specialist computer device 102(2) first connects to a hosts or causes customer computer device 102(1) to connected to the host, using the command "sh vdc," which has logical partitions called Virtual Device Contexts (VDCs) and the feature OTV, split between different logical partitions. The support specialist selects/highlights the bottom half of the screen. Then, at event 2 (shown in FIG. 10B), the support specialist (via support specialist computer device 102(2)) tries the command "sh otv." Later on, at event 3 (shown in FIG. 10C), the support specialist attempts to go to an actual OTV2 VDC, which uses overlay one, for instance virtual local area network (VLAN) "1032," which is active. Then, at event 4 (shown in FIG. 10D), the support specialist checks if any media access control (MAC) address is known for that VLAN using the command "show otv route." The process continues until a final root cause is found.

FIGS. 11A-11E collectively illustrate example extracted knowledge 1100 for a collaborative support session used to troubleshoot a Linux server. Extracted knowledge 1100 includes a recorded time-ordered sequence of extracted knowledge events 1-$n$ at times t1-$tn$ (shown in FIGS. 11A-11E) and records the extracted knowledge and timestamps for each event into a file. The extracted knowledge for each event includes a respective set of extracted knowledge components, including a speech-to-text snippet T, a command C, and a screen shot S (which may include a screen selection) all time-synchronized with one another for the given event.

The troubleshooting scenario depicted in FIGS. 11A-11E represents a procedure that takes the support specialist and the customer through a step-by-step dialogue in which the customer is trying to identify and solve a current problem. For every action, the customer says what she is trying to check and enters corresponding commands into the customer terminal. The output logs of each command help in determining what might be an issue. In the example, at events 1 and 2 (shown in FIGS. 11A and 11B), the customer checks if a web server is installed and running. Then, at events 3 and 4 (shown in FIGS. 11C and 11D), the customer checks a config file and domain name system (DNS) settings. After a few more steps, at event n (shown in FIG. 11E), the customer discovers that a particular service "apache2" is not running, which might be one of the problems. During the entire session, there is a clear time-synchronization between what is being spoken and what commands are tried out on the screen. Utilizing both sources of data (audio and screen sharing image frames) helps in detecting and extracting knowledge from the support sessions.

Knowledge extraction as described above may be enhanced by incorporating data from various other sources, such a whiteboard and media images. The whiteboard is a popular tool to share information while presenting/explaining during collaborative support sessions. During brainstorming discussions, the whiteboard images can serve as a rich source of knowledge. But in terms of digitization, one might have problems correcting errors currently on the whiteboard. Using embodiments presented herein, a participant may take photos of the whiteboard and feed them to knowledge extractor 114. This way, information on the whiteboard can be included in the knowledge base generated by knowledge extractor 114. With respect to media images relevant to a product, when there is only limited visual information available, a participant may find relevant images from third-party resources and include those to enrich resulting knowledge base. The aggregation of such data, stitched together tightly, provides a new way to achieve the underlying goal of extracting pertinent knowledge from video recordings.

Figure 12:
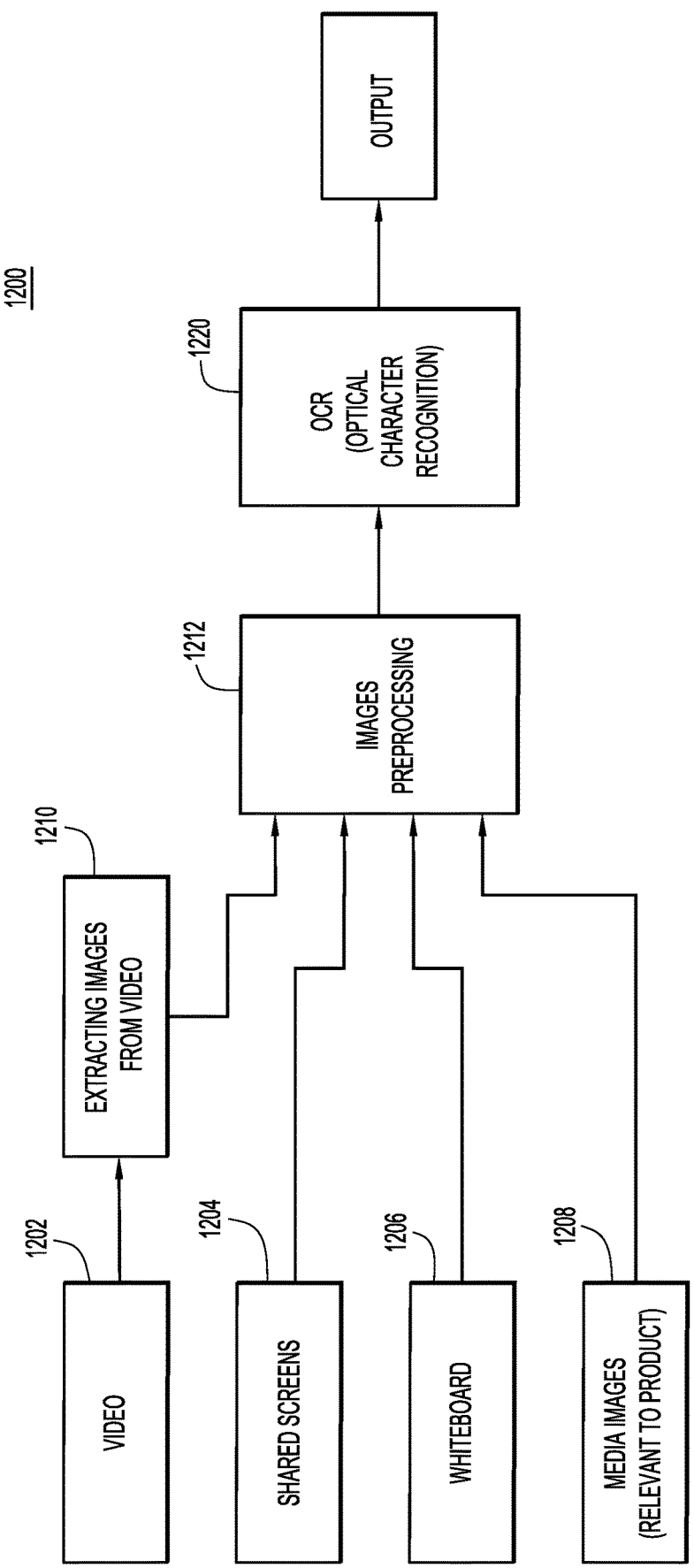
FIG. 12 is an illustration of a knowledge extraction system that incorporates a wide range of sources during a collaborative support session, according to an example embodiment.

With reference to FIG. 12, there is an illustration of a knowledge extraction system 1200 that incorporates a wide range of sources during a collaborative support session. System receives video 1202, shared screen content 1204, whiteboard content 1206, and media images 1208. System 1200 includes an image extractor 1210 to extract images from the video as described above, and provides the images to an image preprocessor 1212. Image preprocessor 1212 performs preprocessing on the images from image extractor 1210 and the images from sources 1204-1208 as described above, to produce preprocessed images. System 1200 includes an OCR module 1220 to convert the preprocessed images to text. The text may be processed as described above to generate/extract useful knowledge.

Figure 13:
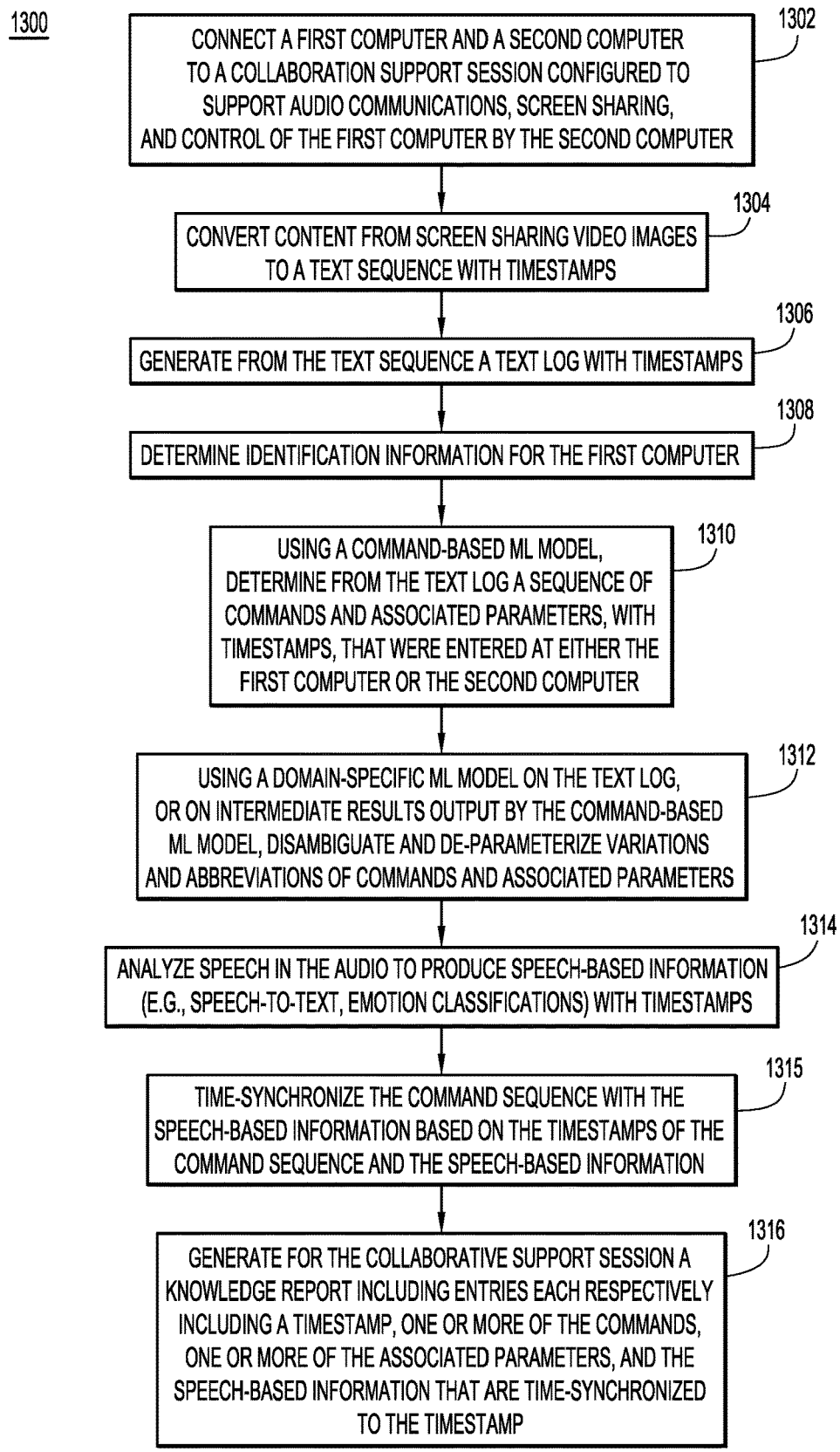
FIG. 13 is a flowchart of a method that summarizes extracting knowledge from a collaborative support session, according to an example embodiment.

With reference to FIG. 13, there is a flowchart of an example method 1300 of extracting knowledge from a collaborative support session. Method 1300 includes operations described above.

At 1302, a first computer device (e.g., computer device 102(1) operated by a customer) and a second computer device (e.g., computer device 102(2) operated by a support specialist) connect to a collaborative support session supported by a communication server (e.g., server 104) to troubleshoot the first computer device and/or customer equipment connected to, and accessible through, the first computer device. The collaborative support session supports audio communications, video communication, screen sharing, and control of the first computer device (and control of the customer equipment through the first computer device) by the second computer device. This operation corresponds to operation 202 described above in connection with FIG. 2.

At 1304, screen sharing video images (that are shared between the first and second computer devices) are converted to a text sequence with timestamps. This operation may include periodically extracting image frames from the screen sharing video images; de-duplicating the image frames; excluding non-text objects from the de-duplicated image frames; performing image segmentation on the image frames resulting from the excluding, to produce segmented image frames; and performing optical character recognition on the segmented image frames to produce the text sequence with timestamps. This operation corresponds to operation 204.

At 1306, a text log (referred to above as a "log-style text stream") with timestamps is generated from the text sequence. The text log includes commands, command parameters associated with the commands, command output, and periodic timestamps. This operation may include joining multiple frame text segments of the text sequence into multiple text lines using distance-based algorithm; sliding the multiple text lines across each other to find a common text overlay; and generating a combined text line that combines the multiple text lines without repeating the common overlay. This operation corresponds to operation 206.

At 1308, identification information for the first computer device is determined. This operation corresponds to operation 208.

At 1310, using a command-based ML model and the identification information, a sequence of commands and associated parameters, with associated timestamps (i.e., command sequence timestamps), that were entered at either the first computer device or the second computer device are determined from the text log. This operation corresponds to operation 210.

At 1312, using a domain specific ML model on the text log or on intermediate results output by the command-based ML model, variations and abbreviations of commands and associated parameters are disambiguated and de-parameterized, to produce at least some of the commands and the associated parameters of the command sequence. This operation corresponds to operation 212.

At 1314, audio associated with the collaborative support session (i.e., from the audio communications) is analyzed to produce speech-based information with associated timestamps (i.e., speech-based information timestamps). In this operation, speech-to-text conversion of the speech in the audio may be performed (to produce speech-to-text with timestamps). Also, machine learning may be applied to speech to classify the speech into emotion classifications with timestamps. Additionally, the audio may be analyzed to detect/identify demarcating sounds with timestamps. This operation corresponds to operation 214.

At 1315, the command sequence and the audio information are time-synchronized (i.e., time-matched) based on the timestamps of the command sequence (i.e., the command sequence timestamps) and the timestamps of the audio information (i.e., audio information timestamps including speech-to-text timestamps and emotion classification timestamps).

At 1316, a knowledge report is generated for the collaborative support session. The knowledge report includes entries each respectively including an entry timestamp, one or more of the commands, one or more of the associated parameters, command output, and the audio information (e.g., speech-to-text and/or emotion classification) that are time-synchronized to the entry timestamp. In addition, each entry may include selected screen content (that has been recorded with timestamps), and identification of screen edit operations (with their associated edit timestamps) that are time-synchronized to the entry timestamp. Each entry may also include information from printed logs (e.g., Logs/Syslog that are printed into standard output (i.e., screen)). Each entry may also include the identification information for the first computer device. This operation corresponds to operation 216.

With reference to FIG. 14, there is an illustration of an example extracted knowledge report 1400 generated at operation 1316. Report 1400 includes timestamped entries 1402(1)-1402(3). The columns of each row, from left-to-right, include: time start and time end; output (the contents of which are reproduced below); a host (e.g., a customer computer device and/or customer equipment connected to the customer computer device) machine identifier; a host serial number; a raw command; a normalized command; command parameters/context; time-in-focus (e.g., how long the support session dwelled on the command); an attention focus (e.g., gleaned from speech-to-text); interactions (e.g., select, copy, edit); interaction context (e.g., ports or networks that are used); speech emotion; and aggregate attention (e.g., a weighted strength of the given row of indicators).

Outputs 1, 2, and 3 in the output column (i.e., the third column from the left) represent detailed troubleshooting diagnostic information as well as identification and performance information for customer equipment (e.g., customer computer device 102(1) and/or customer equipment connected to the customer computer device) under inspection during a collaborative support session. The information in outputs 1, 2, and 3 may be produced, accessed, and/or recorded during the collaborative support session by knowledge extractor 114 and/or computer devices 102.

Memory 1556 stores instructions for implementing methods described herein. Memory 1556 may include read only memory (ROM), random access memory (RAM), magnetic disk storage media devices, optical storage media devices, flash memory devices, electrical, optical, or other physical/tangible (non-transitory) memory storage devices. The processor 1554 is, for example, a microprocessor or a microcontroller that executes instructions stored in memory. Thus, in general, the memory 1556 may comprise one or more tangible computer readable storage media (e.g., a memory device) encoded with software comprising computer executable instructions and when the software is executed (by the processor 1554) it is operable to perform the operations

```
Output 1:
   Ethernet1/3 is up
   admin state is up, Dedicated Interface
      Belongs to Po1
      Hardware: 100/1000/10000 Ethernet, address: 0000.0000.0001 (bia
0000.0000.0001)
      Description: backbone po1
      MTU 1500 bytes, BW 10000000 Kbit, DLY 10 usee
      Reliability 255/255, txload 1/255, rxload 1/255
      Encapsulation ARPA, medium is broadcast
      Port mode is trunk
      Full-duplex, 10 Gb/s
      Beacon is turned off
      Auto-Negotiation is turned on, FEC mode is Auto
      Input flow-control is off, output flow-control is off
      Auto-mdix is turned off
      Switchport monitor is off
      EtherType is 0x8100
      EEE (efficient-Ethernet): n/a
      Last link flapped 5week(s) 5day(s)
      Last clearing of "show interface" counters never
      1 interface resets
      30 seconds input rate 7936 bits/sec, 9 packets/sec
      30 seconds output rate 26354 bits/sec, 13 packets/sec
      Load-Interval #2: 5 minute (300 seconds)
         input rate 7.18 Kbps, 6 pps; output rate 23.05 Kbps, 8 pps
      RX
         321757141 unicast packets 180150 multicast packets 128552
broadcast packets
         322071650 input packets 35899876400 bytes
         1668680 jumbo packets 0 storm suppression bytes
Output 2:
   NOTE: Clear lacp counters to get accurate statistics
```

|  | LACPDUs | | Markers/Resp LACPDUs | | |
|---|---|---|---|---|---|
| Port | Sent | Recv | RecvSent | Pkts | Err |
| port-channel1 | | | | | |
| Ethernet1/3 | 116249 | 116258 | 0 | 0 | 0 |

```
Output 3:
   Capability Codes: R—Router, T—Trans-Bridge, B—Source-Route-Bridge
         S—Switch, H—Host, I—IGMP, r—Repeater,
         V—VoIP-Phone, D—Remotely-Managed-Device,
         s—Supports-STP-Dispute
   Device-ID   Local Intrfce   Hldtme Capability Platform   Port ID
n9k-core2.example.net(sn0000002)
            Eth1/3     124    R S I s   N9K-C93108TC-EX Eth1/4
```

Figure 15:
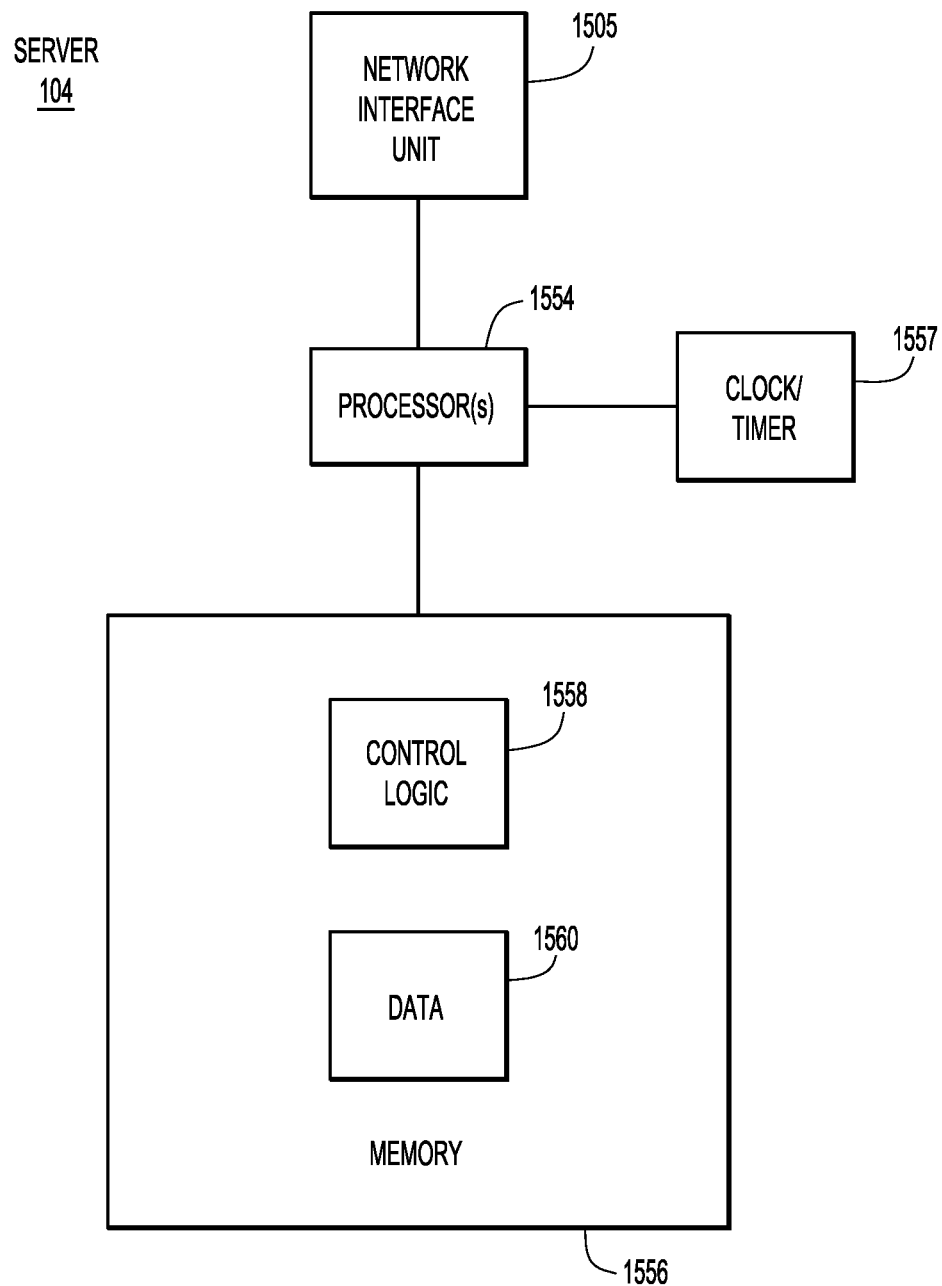
FIG. 15 is a block diagram of a communication server in the network environment, according to an embodiment.

With reference to FIG. 15, there is a block diagram of server 104, according to an embodiment. Server 1500 includes network interface unit 1505 to communicate with a wired and/or wireless communication network. Server 104 also includes a processor 1554 (or multiple processors, which may be implemented as software or hardware processors), and memory 1556. Network interface unit 1505 may include an Ethernet card with a port (or multiple such devices) to communicate over wired Ethernet links and/or a wireless communication card with a wireless transceiver to communicate over wireless links. Server 104 also includes a timer/clock 1557 to provide timestamps/timestamps.

described herein. Memory 1556 stores control logic 1558 to perform operations of performed by communication service 112 and knowledge extractor 114 described herein. Control logic may also store logic for machine learning modules and speech recognition modules described herein. The memory 1556 may also store data 1560 used and generated by logic 1558.

Figure 16:
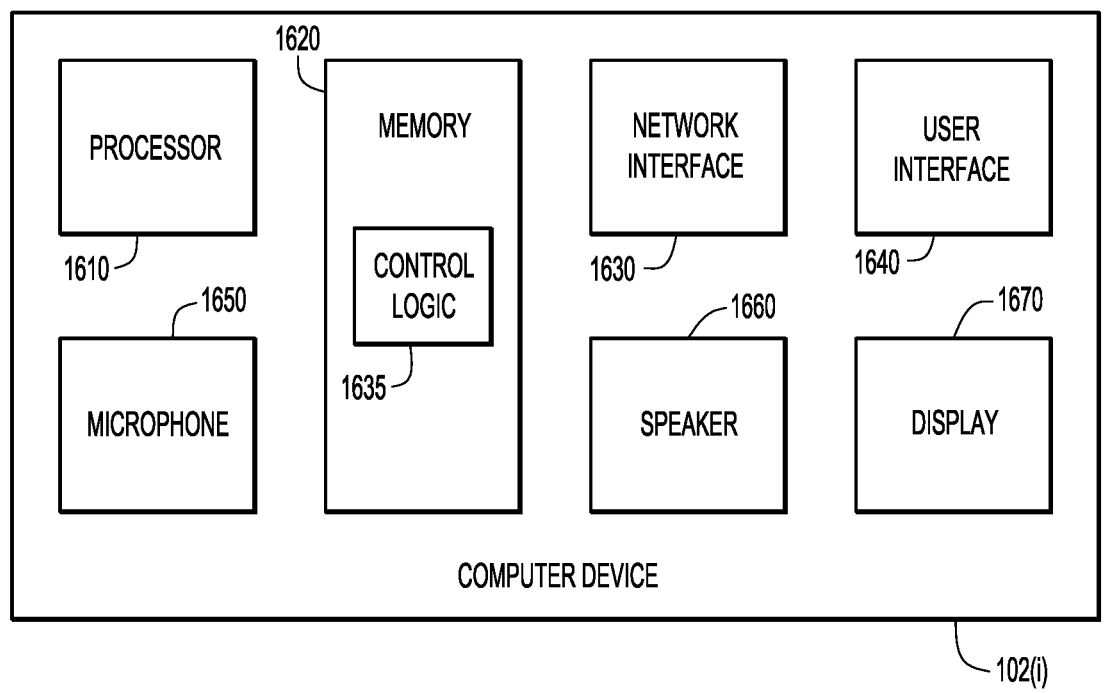
FIG. 16 is a block diagram of a computer device in the network environment, according to an embodiment.

Referring now to FIG. 16, there is shown a block diagram of a computer device 102(i), according to an embodiment. The computer device 102(i) corresponds to either computer device 102(1) or 102(2). The computer device 102(i) includes a processor 1610 to process instructions relevant to communication sessions, memory 1620 to store a variety of data and software instructions. The processor 1610 is, for example, a microprocessor or microcontroller that executes instructions of computer device control logic 1635 in memory 1620 for implementing the processes described herein. The computer device 102(*i*) also includes a network interface unit (e.g., card) 1630 to communicate with other devices over network 106. Network interface unit 1630 may include an Ethernet card with a port (or multiple such devices) to communicate over wired Ethernet links and/or a wireless communication card with a wireless transceiver to communicate over wireless links.

Computer device 102(*i*) may further include a user interface unit 1640 to receive input from a user, microphone 1650 and speaker 1660. The user interface unit 1640 may be in the form of a keyboard, mouse and/or a touchscreen user interface to allow for a user to interface with the computer device 102(*i*). Microphone 1650 and speaker 1660 enable audio to be recorded and output. Computer device 102(*i*) may also comprise a display 1670, including, e.g., a touchscreen display, that can display data to a user.

Memory 1620 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, the memory 1620 may comprise one or more tangible (non-transitory) computer readable storage media (e.g., a memory device) encoded with software (e.g., control logic/software 1635) comprising computer executable instructions and when the software is executed (by the processor 1610) it is operable to perform the operations described herein for computer device 102(*i*). In an embodiment in which computer device 102(*i*) performs operations for knowledge extractor 114, control logic 1635 includes instructions to perform the operations of knowledge extractor 114. Logic 1635 includes instructions to generate and display graphical user interfaces to present information on display 1670 and allow a user to provide input to the computer device 102(*i*) through, e.g., user selectable options of the graphical user interface. Memory 1620 also stores data generated and used by computer device control logic 1635.

In summary, in one aspect, a method is provided comprising: at a communication server, connecting a first computer device and a second computer device to a collaborative support session configured to support audio communications, screen sharing, and control of the first computer device by the second computer device: converting screen sharing video image content to a text sequence with timestamps; generating from the text sequence a text log with timestamps; using a command-based machine learning model, determining from the text log a command sequence including commands and associated parameters, with command sequence timestamps, that were entered at either the first computer device or the second computer device; analyzing audio associated with the collaborative support session to produce speech-based information with speech-based information timestamps; time-synchronizing the command sequence with the speech-based information based on the command sequence timestamps and the speech-based information timestamps; and generating for the collaborative support session a knowledge report including entries each respectively including a timestamp, one or more of the commands and the associated parameters, and the speech-based information that are time-synchronized to the timestamp.

In another aspect, an apparatus is provided comprising: a network interface unit to communicate with a network; and a processor of a communication server coupled to the network interface and configured to perform operations including: connecting a first computer device and a second computer device to a collaborative support session configured to support audio communications, screen sharing, and control of the first computer device by the second computer device; converting screen sharing video image content to a text sequence with timestamps; generating from the text sequence a text log with timestamps; using a command-based machine learning model, determining from the text log a command sequence including commands and associated parameters, with command sequence timestamps, that were entered at either the first computer device or the second computer device; analyzing audio associated with the collaborative support session to produce speech-based information with speech-based information timestamps; time-synchronizing the command sequence with the speech-based information based on the command sequence timestamps and the speech-based information timestamps; and generating for the collaborative support session a knowledge report including entries each respectively including a timestamp, one or more of the commands and the associated parameters, and the speech-based information that are time-synchronized to the timestamp.

In yet another aspect, a non-transitory, tangible, computer readable medium is provided. The computer readable medium stores instructions that, when executed by a processor, performs: connecting a first computer device and a second computer device to a collaborative support session configured to support audio communications, screen sharing, and control of the first computer device by the second computer device; converting screen sharing video image content to a text sequence with timestamps; generating from the text sequence a text log with timestamps; using a command-based machine learning model, determining from the text log a command sequence including commands and associated parameters, with command sequence timestamps, that were entered at either the first computer device or the second computer device; analyzing audio associated with the collaborative support session to produce speech-based information with speech-based information timestamps; time-synchronizing the command sequence with the speech-based information based on the command sequence timestamps and the speech-based information timestamps; and generating for the collaborative support session a knowledge report including entries each respectively including a timestamp, one or more of the commands and the associated parameters, and the speech-based information that are time-synchronized to the timestamp.

Although the techniques are illustrated and described herein as embodied in one or more specific examples, it is nevertheless not intended to be limited to the details shown, since various modifications and structural changes may be made within the scope and range of equivalents of the claims.

What is claimed is:

1. A method comprising:
    at a communication server, connecting a first computer device and a second computer device to a collaborative support session configured to support audio communications, screen sharing, and control of the first computer device by the second computer device:
    converting screen sharing video image content to a text sequence with timestamps;

generating from the text sequence a text log with timestamps by joining frame text segments of the text sequence into text lines using a distance-based algorithm, sliding the text lines across each other to find a common text overlay, and generating a combined text line that combines the text lines without repeating the common text overlay;

determining from the text log a command sequence including commands and associated parameters, with command sequence timestamps, that were entered at either the first computer device or the second computer device;

analyzing audio associated with the collaborative support session to produce speech-based information with speech-based information timestamps;

time-synchronizing the command sequence with the speech-based information based on the command sequence timestamps and the speech-based information timestamps; and generating for the collaborative support session a knowledge report including entries each respectively including a timestamp, one or more of the commands and the associated parameters, and the speech-based information that are time-synchronized to the timestamp.

2. The method of claim 1, further comprising:
determining identification information for the first computer device; and
using a command-based machine learning model includes to perform the determining the command sequence based on the identification information and the text log.

3. The method of claim 2, further comprising:
using a mapping database, mapping abbreviations of commands generated by the command-based machine learning model to at least some of the commands of the command sequence.

4. The method of claim 2, further comprising:
using a domain specific machine learning model on the text log or on intermediate results output by the command-based machine learning model, disambiguating and de-parameterizing variations and abbreviations of commands and associated parameters to produce at least some of the commands and the associated parameters of the command sequence.

5. The method of claim 1, wherein:
the analyzing the audio includes:
performing speech-to-text conversion of speech in the audio; and
using machine learning on the speech to classify the speech into emotion classifications; and
the generating the knowledge report includes generating each entry to further include, respectively, a snippet of converted speech-to-text and an emotion classification that are time-synchronized to the timestamp.

6. The method of claim 1, further comprising:
recording selections of screen content with screen content timestamps,
wherein the generating the knowledge report includes generating each entry to further include, respectively, one of the selections of screen content that is time-synchronized to the timestamp.

7. The method of claim 6, further comprising:
identifying edit operations performed on the screen content and associating the edit operations with edit timestamps that indicate when the edit operations occurred,
wherein the generating the knowledge report further includes generating each entry to further include, respectively, one of the edit operations that is time-synchronized to the timestamp.

8. The method of claim 1, wherein the converting the screen sharing video content to the text sequence with timestamps includes:
periodically extracting image frames from the screen sharing video image content;
de-duplicating the image frames to produce de-duplicated image frames;
excluding non-text objects from the de-duplicated image frames;
performing image segmentation on the image frames resulting from the excluding, to produce segmented image frames; and
performing optical character recognition on the segmented image frames to produce the text sequence with the timestamps.

9. The method of claim 1, further comprising:
using a command-based machine learning model to perform the determining.

10. The method of claim 1, wherein the first computer device is a customer computer device and the second computer device is a support specialist computer device, and the collaborative support session includes a troubleshooting session to troubleshoot the customer computer device or customer equipment accessible through the customer computer device via the support specialist computer device.

11. The method of claim 1, wherein the text log includes the commands, the associated parameters, and command output responsive to the commands, and the generating the knowledge report includes generating the knowledge report such that the entries further include the command output.

12. An apparatus comprising:
a network interface to communicate with a network; and
a processor of a communication server coupled to the network interface and configured to perform operations including:
connecting a first computer device and a second computer device to a collaborative support session configured to support audio communications, screen sharing, and control of the first computer device by the second computer device;
converting screen sharing video image content to a text sequence with timestamps;
generating from the text sequence a text log with timestamps by joining frame text segments of the text sequence into text lines using a distance-based algorithm, sliding the text lines across each other to find a common text overlay, and generating a combined text line that combines the text lines without repeating the common text overlay;
determining from the text log a command sequence including commands and associated parameters, with command sequence timestamps, that were entered at either the first computer device or the second computer device;
analyzing audio associated with the collaborative support session to produce speech-based information with speech-based information timestamps;
time-synchronizing the command sequence with the speech-based information based on the command sequence timestamps and the speech-based information timestamps; and
generating for the collaborative support session a knowledge report including entries each respectively including a timestamp, one or more of the commands and the associated parameters, and the speech-based information that are time-synchronized to the timestamp.

13. The apparatus of claim 12, wherein the operations further include:
   determining identification information for the first computer device; and
   using a command-based machine learning model to perform the determining the command sequence based on the identification information and the text log.

14. The apparatus of claim 13, wherein the operations further include:
   using a domain specific machine learning model on the text log or on intermediate results output by the command-based machine learning model, disambiguating and de-parameterizing variations and abbreviations of commands and associated parameters to produce at least some of the commands and the associated parameters of the command sequence.

15. The apparatus of claim 12, wherein:
   the analyzing the audio includes:
      performing speech-to-text conversion of speech in the audio; and
      using machine learning on the speech to classify the speech into emotion classifications; and
   the generating the knowledge report includes generating each entry to further include, respectively, a snippet of converted speech-to-text and an emotion classification that are time-synchronized to the timestamp.

16. The apparatus of claim 12, wherein the operations further include:
   recording selections of screen content with screen content timestamps,
   wherein the generating the knowledge report includes generating each entry to further include, respectively, one of the selections of screen content that is time-synchronized to the timestamp.

17. The apparatus of claim 16, wherein the operations further include:
   identifying edit operations performed on the screen content and associating the edit operations with edit timestamps that indicate when the edit operations occurred,
   wherein the generating the knowledge report further includes generating each entry to further include, respectively, one of the edit operations that is time-synchronized to the timestamp.

18. A non-transitory computer readable medium encoded with instructions that, when executed by a processor, cause the processor to perform:
   connecting a first computer device and a second computer device to a collaborative support session configured to support audio communications, screen sharing, and control of the first computer device by the second computer device;
   converting screen sharing video image content to a text sequence with timestamps;
   generating from the text sequence a text log with timestamps by joining frame text segments of the text sequence into text lines using a distance-based algorithm, sliding the text lines across each other to find a common text overlay, and generating a combined text line that combines the text lines without repeating the common text overlay;
   determining from the text log a command sequence including commands and associated parameters, with command sequence timestamps, that were entered at either the first computer device or the second computer device;
   analyzing audio associated with the collaborative support session to produce speech-based information with speech-based information timestamps;
   time-synchronizing the command sequence with the speech-based information based on the command sequence timestamps and the speech-based information timestamps; and
   generating for the collaborative support session a knowledge report including entries each respectively including a timestamp, one or more of the commands and the associated parameters, and the speech-based information that are time-synchronized to the timestamp.

19. The non-transitory computer readable medium of claim 18, further comprising instructions to cause the processor to perform:
   determining identification information for the first computer device; and
   using a command-based machine learning model to perform the determining the command sequence based on the identification information and the text log.

20. The non-transitory computer readable medium of claim 19, further comprising instructions to cause the processor to perform:
   using a domain specific machine learning model on the text log or on intermediate results output by the command-based machine learning model, disambiguating and de-parameterizing variations and abbreviations of commands and associated parameters to produce at least some of the commands and the associated parameters of the command sequence.

* * * * *